United States Patent
Jaiswal et al.

(10) Patent No.: US 10,540,217 B2
(45) Date of Patent: Jan. 21, 2020

(54) MESSAGE CACHE SIZING

(71) Applicant: Oracle International Corporation, Redwood Shores, CA (US)

(72) Inventors: Mukesh Jaiswal, Bangalore (IN); Shubha Bose, Bangalore (IN); James W. Stamos, Saratoga, CA (US); Alan R. Downing, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 32 days.

(21) Appl. No.: 15/685,270

(22) Filed: Aug. 24, 2017

(65) Prior Publication Data
US 2018/0081745 A1    Mar. 22, 2018

Related U.S. Application Data

(60) Provisional application No. 62/395,639, filed on Sep. 16, 2016.

(51) Int. Cl.
*G06F 9/54* (2006.01)
*G06F 12/0811* (2016.01)

(52) U.S. Cl.
CPC .......... *G06F 9/546* (2013.01); *G06F 12/0811* (2013.01)

(58) Field of Classification Search
CPC .. G06F 9/546; G06F 12/0811; G06F 12/0871; G06F 11/34; G06F 12/0862;
(Continued)

(56) References Cited

U.S. PATENT DOCUMENTS

| | | | |
|---|---|---|---|
| 4,318,182 A | 3/1982 | Bachman et al. | |
| 5,113,522 A | 5/1992 | Dinwiddie et al. | |

(Continued)

FOREIGN PATENT DOCUMENTS

| | | | |
|---|---|---|---|
| EP | 0 750 256 A2 | 6/1996 | |
| EP | 0 942 363 A2 | 9/1999 | |

(Continued)

OTHER PUBLICATIONS

Kei Kurakawa et al., "Life Cycle Design Support Based on Environmental Information Sharing," IEEE, Feb. 1-3, 1999, Proceedings EcoDesign '99, First International Symposium, pp. 138-142.
(Continued)

*Primary Examiner* — Charles E Anya
(74) *Attorney, Agent, or Firm* — Hickman Palermo Becker Bingham LLP

(57) ABSTRACT

A method and apparatus for message cache sizing are provided. A plurality of messages from one or more enqueuers are enqueued in a queue comprising at least one shard. Each shard includes one or more subshards. A message cache configured to store a plurality of cached subshards is maintained in memory. The plurality of messages is dequeued from the message cache by one or more dequeuers. An estimated enqueue rate is determined for each shard. An estimated dequeue rate is determined for each dequeuer-shard pair. Estimated restore overhead data is determined over a range of candidate message cache sizes based on the estimated enqueue rate for each shard and the estimated dequeue rate for each dequeuer-shard pair. A preferred message cache size is determined based on the estimated restore overhead data.

20 Claims, 11 Drawing Sheets

(58) Field of Classification Search
CPC ....... G06F 2212/163; G06F 2212/1044; G06F 2212/466; G06F 2212/601; G06F 2212/6028; G06F 2212/1016
See application file for complete search history.

(56) References Cited

U.S. PATENT DOCUMENTS

| | | |
|---|---|---|
| 5,222,217 A | 6/1993 | Blount et al. |
| 5,347,632 A | 9/1994 | Filepp et al. |
| 5,357,612 A | 10/1994 | Alaiwan |
| 5,465,328 A | 7/1995 | Dievendorff et al. |
| 5,546,570 A | 8/1996 | McPherson et al. |
| 5,627,764 A | 5/1997 | Schutzman et al. |
| 5,721,825 A | 2/1998 | Lawson et al. |
| 5,790,807 A | 8/1998 | Fishler et al. |
| 5,802,253 A | 9/1998 | Gross et al. |
| 5,828,835 A | 10/1998 | Isfeld et al. |
| 5,867,665 A | 2/1999 | Butman et al. |
| 5,867,667 A | 2/1999 | Butman et al. |
| 5,870,562 A | 2/1999 | Butman et al. |
| 5,878,056 A | 3/1999 | Black et al. |
| 5,884,035 A | 3/1999 | Butman et al. |
| 5,890,167 A | 3/1999 | Bridge et al. |
| 5,933,604 A | 8/1999 | Inakoshi et al. |
| 5,940,839 A | 8/1999 | Chen et al. |
| 5,951,694 A | 9/1999 | Choquier et al. |
| 6,026,430 A | 2/2000 | Butman et al. |
| 6,029,205 A | 2/2000 | Alferness et al. |
| 6,041,357 A | 3/2000 | Kunzelman et al. |
| 6,058,389 A | 5/2000 | Chandra et al. |
| 6,088,728 A | 7/2000 | Bellemore et al. |
| 6,182,086 B1 | 1/2001 | Lomet et al. |
| 6,188,699 B1 | 2/2001 | Lang et al. |
| 6,243,751 B1 | 6/2001 | Chatterjee et al. |
| 6,272,500 B1 | 8/2001 | Sugita |
| 6,330,686 B1 | 12/2001 | Denny et al. |
| 6,334,114 B1 | 12/2001 | Jacobs et al. |
| 6,338,074 B1 | 1/2002 | Poindexter et al. |
| 6,393,423 B1 | 5/2002 | Goedken |
| 6,442,568 B1 | 8/2002 | Velasco et al. |
| 6,473,794 B1 | 10/2002 | Guheen et al. |
| 6,480,500 B1 | 11/2002 | Erimli et al. |
| 6,493,826 B1 | 12/2002 | Schofield et al. |
| 6,515,968 B1 | 2/2003 | Combar et al. |
| 6,519,571 B1 | 2/2003 | Guheen et al. |
| 6,529,932 B1 | 3/2003 | Dadiomov et al. |
| 6,536,037 B1 | 3/2003 | Guheen et al. |
| 6,622,057 B1 | 9/2003 | Ko et al. |
| 6,654,907 B2 | 11/2003 | Stanfill et al. |
| 6,658,596 B1 | 12/2003 | Owen |
| 6,691,155 B2 | 2/2004 | Gottfried |
| 6,704,831 B1 | 3/2004 | Avery |
| 6,826,182 B1 | 11/2004 | Parthasarathy |
| 7,058,957 B1 | 6/2006 | Nguyen |
| 7,068,775 B1 | 6/2006 | Lee |
| 7,092,975 B2 | 8/2006 | Bradley et al. |
| 7,587,450 B2 | 9/2009 | Morris |
| 7,664,724 B2 | 2/2010 | Lucovsky et al. |
| 8,037,024 B1 | 10/2011 | Bozkaya |
| 8,489,820 B1 | 7/2013 | Ellard |
| 8,959,067 B1 | 2/2015 | Patiejunas |
| 10,067,959 B1* | 9/2018 | Animesh ............... G06F 16/245 |
| 2001/0047270 A1 | 11/2001 | Gusick et al. |
| 2001/0052137 A1 | 12/2001 | Klein |
| 2002/0049845 A1 | 4/2002 | Sreenivasan et al. |
| 2002/0073019 A1 | 6/2002 | Deaton et al. |
| 2002/0073139 A1 | 6/2002 | Hawkins et al. |
| 2002/0091991 A1 | 7/2002 | Castro |
| 2002/0099697 A1 | 7/2002 | Jensen-Grey |
| 2002/0112008 A1 | 8/2002 | Christenson et al. |
| 2002/0116457 A1 | 8/2002 | Eshleman et al. |
| 2002/0138582 A1 | 9/2002 | Chandra et al. |
| 2002/0144010 A1 | 10/2002 | Youris et al. |
| 2002/0161896 A1 | 10/2002 | Wen et al. |
| 2002/0186656 A1 | 12/2002 | Vu |
| 2002/0194081 A1 | 12/2002 | Perkowski |
| 2003/0037146 A1 | 2/2003 | O'Neill |
| 2003/0039212 A1 | 2/2003 | Lloyd et al. |
| 2003/0110085 A1 | 6/2003 | Murren et al. |
| 2003/0135609 A1 | 7/2003 | Carlson et al. |
| 2003/0177187 A1 | 9/2003 | Levine et al. |
| 2003/0212657 A1 | 11/2003 | Kaluskar et al. |
| 2003/0212670 A1 | 11/2003 | Yalamanchi et al. |
| 2003/0212834 A1 | 11/2003 | Potter et al. |
| 2003/0236834 A1 | 12/2003 | Gottfried |
| 2004/0024771 A1 | 2/2004 | Jain et al. |
| 2004/0024774 A1 | 2/2004 | Jain et al. |
| 2004/0024794 A1 | 2/2004 | Jain et al. |
| 2004/0034640 A1 | 2/2004 | Jain et al. |
| 2004/0034664 A1 | 2/2004 | Jain et al. |
| 2004/0049601 A1 | 3/2004 | Boyd et al. |
| 2004/0064548 A1 | 4/2004 | Adams et al. |
| 2004/0103195 A1 | 5/2004 | Chalasani et al. |
| 2004/0107125 A1 | 6/2004 | Guheen et al. |
| 2004/0162859 A1 | 8/2004 | Guo et al. |
| 2005/0198207 A1 | 9/2005 | Hoblit |
| 2005/0262215 A1 | 11/2005 | Kirov et al. |
| 2006/0059228 A1 | 3/2006 | Kasamsetty et al. |
| 2006/0069605 A1 | 3/2006 | Hatoun |
| 2006/0218560 A1 | 9/2006 | Dadiomov et al. |
| 2007/0101341 A1 | 5/2007 | Dowing |
| 2009/0133023 A1 | 5/2009 | Li |
| 2010/0198920 A1 | 8/2010 | Wong |
| 2010/0281491 A1 | 11/2010 | Surlaker |
| 2011/0099233 A1 | 4/2011 | Calder |
| 2011/0202929 A1 | 8/2011 | Schleimer |
| 2014/0040040 A1 | 2/2014 | Townsend |
| 2014/0067940 A1 | 3/2014 | Li |
| 2014/0280373 A1* | 9/2014 | Raitto ............... G06F 16/27 707/803 |
| 2014/0372486 A1 | 12/2014 | Bose et al. |
| 2014/0372489 A1 | 12/2014 | Jaiswal et al. |
| 2014/0372702 A1 | 12/2014 | Subramanyan et al. |
| 2015/0121048 A1 | 4/2015 | Lukefahr et al. |
| 2016/0142510 A1 | 5/2016 | Westphal et al. |
| 2018/0060145 A1 | 3/2018 | Jaiswal |

FOREIGN PATENT DOCUMENTS

| | | |
|---|---|---|
| EP | 0 992 909 A2 | 4/2000 |
| EP | 1 170 662 A2 | 1/2002 |
| EP | 1 260 902 A2 | 5/2002 |
| WO | WO0010084 A | 2/2000 |
| WO | WO02/05116 A2 | 1/2002 |
| WO | WO02/097676 A2 | 12/2002 |
| WO | WO03/014928 A2 | 2/2003 |
| WO | WO03014929 A | 2/2003 |
| WO | WO03/062983 A2 | 7/2003 |

OTHER PUBLICATIONS

Oliver Gunther, et al., "MMM: A Web-Based System for Sharing Statistical Computing Modules," IEEE, May-Jun. 1997, vol. 1, Issue 3, pp. 59-68.

Chase, Jeffrey S. et al., "Dynamic Virtual Clusters in a Grid Site Manager," Proceedings of the 12th IEEE International Symposium on High Performance Distributed Computing (HPDC'03), 2003. IEEE. pp. 90-100.

Kokku, Ravi et al., "Half-pipe Anchoring: An Efficient Technique for Multiple Connection Handoff," Proceedings 10th International Conference on Network Protocols, Nov. 12, 2002, XP010632563, 10 pages.

Lin, Ying-Dar et al., "Direct Web Switch Routing with State Migration, TCP Masquerade, and Cookie Name Rewriting," Globecom 2003, IEEE Global Telecommunications Conference, Dec. 1, 2003, IEEE, CP010677300, pp. 3663-3667.

Skow, Eric, et al., "A Security Architecture for Application Session Handoff," 2002, IEEE International Conference Proceedings, Apr. 28-May 2, 2002, vol. 1 of 5, pp. 2058-2063, XP010589848.

Song, Henry, et al., "Browser State Repository Service," Lecture Notes in Computer Science, vol. 2414, 2002, pp. 1-14, XP002904339.

(56) References Cited

OTHER PUBLICATIONS

Jaiswal, U.S. Appl. No. 15/254,278, filed Sep. 1, 2016, Notice of Allowance, dated Feb. 6, 2018.
Sugumar et al., "Efficient Simulation of Caches Under Optimal Replacement with Applications to Miss Characterization", dated 1992, 22 pages.
Kejser, Thomas, "Table Pattern: Database Message Queues", dated May 25, 2012, 10 pages.
Belady, L.A., "A Study of Replacement Algorithms for a Virtrual-Storage Computer", IBM Systems Journal, vol. 5, No. 2, dated 1966, 24 pages.
Vojin G. Oklobdzija, "Chapter 17.5—Limitations of Simple Prefectching and Caching Strategies", Digital Systems and Applications, dated Nov. 26, 2007, CRC Press, 1 page.

\* cited by examiner

MESSAGE CACHE SIZING

CROSS-REFERENCE TO RELATED APPLICATIONS

The present application claims priority to U.S. Provisional Application No. 62/395,639, filed Sep. 16, 2016, entitled Message Cache Sizing, the entire contents of which is hereby incorporated by reference as if fully set forth herein. The present application is related to Appln. Ser. No. 15/254,278 (now U.S. Pat. No. 9,996,404), filed Sep. 1, 2016, entitled Message Cache Management for Message Queues, the entire contents of which is hereby incorporated by reference as if fully set forth herein.

FIELD

Embodiments described herein relate generally to queues, and more specifically, to techniques for message cache sizing.

BACKGROUND

In many applications, it is necessary for one process executing on a computer system to communicate with one or more other processes executing on the same or other computer systems. The mechanism used to carry out these communications varies from system to system. One mechanism that has facilitated process-to-process communication in a variety of systems is a message queue. Processes send information to other processes by enqueuing messages in the message queue. The receiving processes obtain the information by dequeuing the messages from the message queue. Typically, these messages are read in a first-in first-out manner. Implementations of message queues are described in U.S. Pat. Nos. 7,181,482, 7,185,033, 7,185,034, 7,203,706, 7,779,418, 7,818,386, 7,680,793, 6,058,389, and 8,397,244, the contents of which are incorporated herein by reference in their entirety.

A message queue may be implemented in memory or on secondary storage, such as a magnetic disk, optical disk, or solid-state drive, or any other persistent secondary storage. An in-memory message queue allows queue operations to take place in memory, thereby reducing I/O latency. However, memory is generally a more limited resource. Thus, it may not always be assumed that a message queue can be completely implemented in memory.

An in-memory message cache that is backed by secondary storage may be used to store at least a portion of the messages in the message queue in memory. This allows for queue operations to be performed in memory without limiting the size of the message queue to the available memory. For example, database-backed queues may be architected to handle extremely large queues. In a database-implemented message queue, an enqueuing process uses a connection to the database, or an enqueue session, to enqueue messages, and dequeuers use dequeue sessions to dequeue messages. Various caching algorithms exist for selecting a subset of data to store in memory. These algorithms include suboptimal algorithms, such as first-in, first-out (FIFO) and least recently used (LRU), as well as optimal algorithms, such as optimal page replacement (OPT) for virtual memory swapping.

Conventional implementations of message queues do not scale well. Specifically, as the number of dequeue sessions increases, the contention for the "hot" messages at the head of the queue increases, thereby degrading performance. In addition, when the enqueue sessions and dequeue sessions are spread across several systems, the amount of communication on the network and/or interconnect between systems can become excessive. Sharded queues address some of these issues. A sharded queue includes one or more shards. Within each shard, the messages are ordered based on enqueue time. However, no message order is enforced between shards. Typically, a dequeue session dequeues messages from each shard in a first-in first-out order. However, no dequeue order is enforced between shards. Implementations of sharded queues are described in U.S. Patent Application Pub. No. 2014/0372486, U.S. Patent Application Pub. No. 2014/0372489, and U.S. Patent Application Pub. No. 2014/0372702, the contents of which are incorporated herein by reference in their entirety.

The performance of a system is affected by properties of the message cache, such as the size of the message cache (e.g. an amount of memory allocated to the message cache). When the size of the message cache is too large, unused portions of the message cache require memory, reducing the availability of memory for other system processes.

When the size of the message cache is too small, the overhead of moving messages between secondary storage and the message cache can consume excessive computational resources and can reduce system throughput. Furthermore, when the size of the message cache is too small, there is an increased chance of messages not being present in the message cache when a queue operation is requested. This causes I/O latency when processing the requested queue operation because the message must be retrieved from secondary storage at the time of the request. Such factors can significantly affect the performance of a system.

Thus, there is a need for techniques for message cache sizing.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the embodiments. It will be apparent, however, that the embodiments may be practiced without these specific details. In other instances, well-known structures and devices are shown in block diagram form in order to avoid unnecessarily obscuring embodiments.

General Overview

Techniques are described herein for message cache sizing. A properly-sized message cache prevents inefficient operations, such as frequent swapping of message between memory and secondary storage, while limiting the amount of memory used for the message cache. Message cache sizing techniques are performed using a lightweight set of statistics that may be generated and updated during runtime.

A sharded queue includes one or more shards. Within each shard, the messages are ordered based on enqueue time. However, no message order is enforced between shards. The number of shards in a sharded queue may change during runtime. A queue that does not have multiple shards implemented is a queue with one shard. Generally, each dequeuer dequeues messages from a plurality of shards of the sharded queue, where all the messages from a particular shard are dequeued in order. No dequeue order is enforced between shards. Each shard includes one or more ordered subshards. When a dequeuer dequeues from a particular shard, it processes the ordered subshards to obtain the messages in enqueue order.

Statistics on enqueue and dequeue rates are collected and updated to determine estimated access time data for a plurality of subshards. An estimated enqueue rate is determined for each shard. An estimated dequeue rate is determined for each dequeuer-shard pair. Estimated restore overhead data is determined over a range of candidate message cache sizes based on the estimated enqueue rate for each shard and the estimated dequeue rate for each dequeuer-shard pair. In some embodiments, the estimated restore overhead data includes an estimated uneviction rate that is determined over a range of message cache sizes from a lower-bound size to an upper-bound size. A preferred message cache size is determined based on the estimated restore overhead data generated over the range of message cache sizes.

Queues and Sharded Queues

Figure 1:
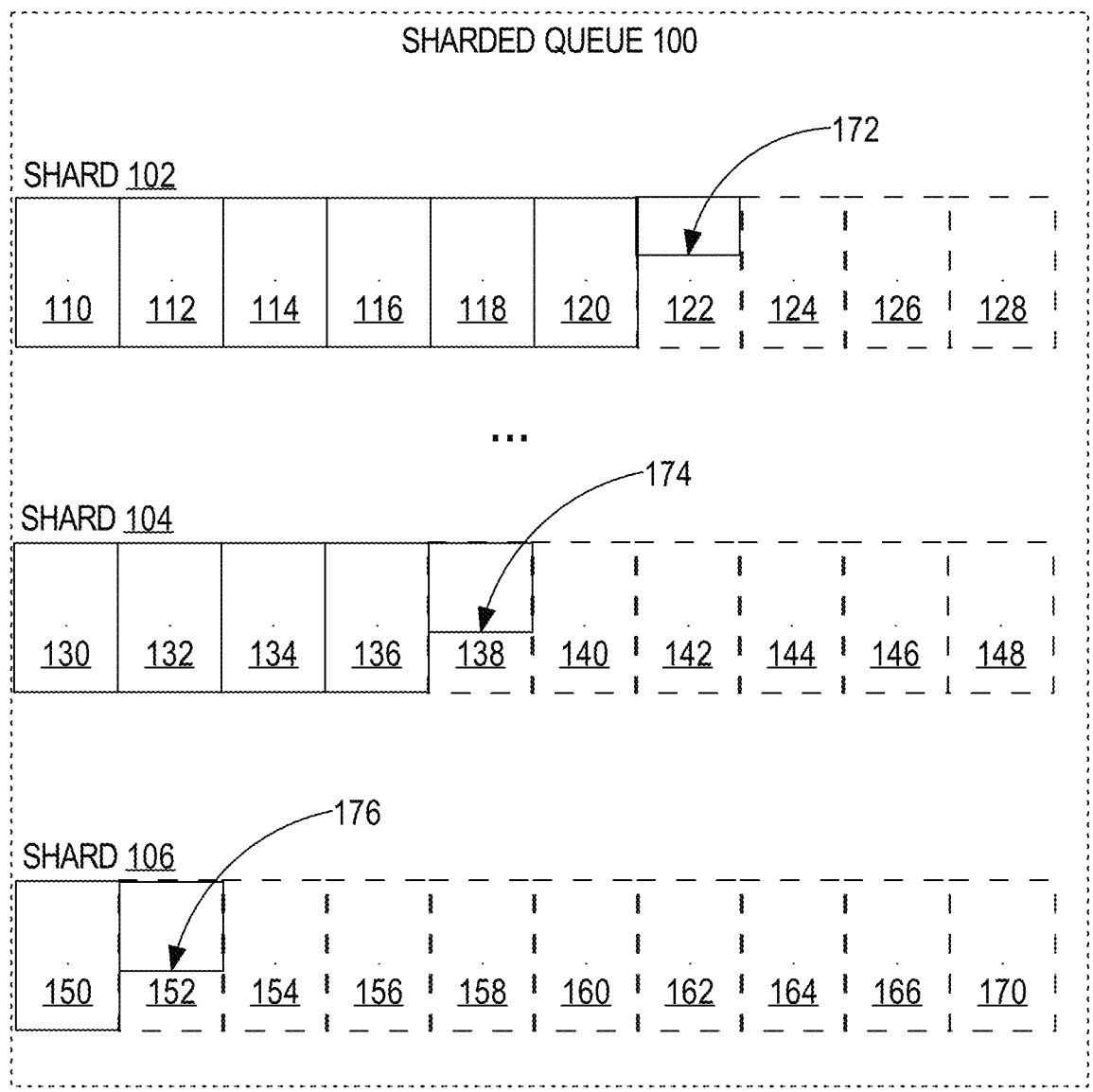
FIG. 1 is a block diagram depicting an example queue in accordance with one or more embodiments.

FIG. 1 is a block diagram depicting an example sharded queue in accordance with one or more embodiments. Sharded queue 100 includes multiple shards 102-106. While the illustrated embodiment shows three shards, the actual number of shards used to implement a sharded queue may vary from implementation to implementation. In some embodiments, the number of shards for a sharded queue can be specified by an administrator. Alternatively and/or in addition, lower and/or upper bounds may be specified for the number of shards 102-106 in a sharded queue 100. Alternatively and/or in addition, a system that implements the sharded queue 100 may determine the number of shards and/or dynamically vary the number of shards. Embodiments described herein are described with respect to a sharded queue with one or more shards, and may be generalized to a queue with any number of shards, including a queue with one shard and/or a queue that is not sharded.

One or more enqueuers enqueue messages in the sharded queue 100. As used herein, the term "message" refers to any data to be communicated via a queue. In some embodiments, a message includes a set of metadata and a payload. The shards 102-106 store distinct sets of messages for the same sharded queue 100. Within each shard 102-106, messages are ordered based on enqueue time. However, no message order is enforced between shards 102-106. To store items in enqueue order, any means of storage that allows the enqueue order to be reconstructed from the stored data is sufficient.

In some embodiments, all messages from a particular enqueuer are enqueued in a particular shard of the sharded queue. As used herein, "enqueue affinity" refers to the relationship between the particular shard and the particular enqueuer. Enqueue affinity ensures session ordering requirements are met, in the absence of failures, because every dequeuer will see the messages each enqueuer enqueued in the correct order. For example, when a first set of one or more enqueuers enqueue messages into sharded queue 100, the messages are always enqueued into shard 102; when a second set of one or more enqueuers enqueue messages into sharded queue 100, the messages are always enqueued into shard 104; when a third set of one or more enqueuers enqueue messages into sharded queue 100, the messages are always enqueued into shard 106.

In some embodiments, the shards 102-106 of the sharded queue are maintained separately from each other. For example, the shards 102-106 may be maintained by multiple database server instances of a multi-instance database, other server application instances, and/or computing units. In some embodiments, each database server instance of a multi-instance database maintains a single shard 102-106 of a sharded queue. Alternatively and/or in addition, one or more instances of a multi-instance database may maintain multiple shards 102-106 of a sharded queue 100. Alternatively and/or in addition, the multiple shards 102-106 may be maintained by a single server, application, and/or computing unit. As used herein, the term "server," refers to a combination of integrated software components and an allocation of computational resources, such as memory, a node, and processes on the node for executing the integrated software components, where the combination of the software and computational resources are dedicated to providing a particular type of function on behalf of clients of the server.

Subshards

Each shard 102-106 may be divided into one or more subshards 110-170. As used herein, the term "subshard" refers to a sequence of one or more adjacent messages in a shard, where adjacency is determined by message enqueue time. A subshard includes a subset of messages enqueued in a particular shard. Within a subshard, messages are stored in enqueue order. For example, all of the messages within subshard 110 can be retrieved in order based on the time the message was enqueued by any enqueuer that enqueues into shard 102. Subshards of a shard are themselves also ordered by enqueue-time. For example, all messages in subshard 110 were enqueued into shard 102 before the messages in subshard 112, and all messages in subshard 112 were enqueued into shard 102 before the messages in subshard 114, and so on. In some embodiments, the techniques described herein are implemented on a queue that is not sharded, which can be treated as a queue with a single shard. In this case, the entire queue is treated as a single shard that contains a plurality of subshards.

A dequeuer can access the messages in each shard in enqueue-time order based on the ordering of subshards 110-170 and the ordering of messages within each subshard 110-170. When a particular enqueuer only enqueues messages into a particular shard, a dequeuer can dequeue the messages from the particular enqueuer in order, thereby maintaining session ordering.

When a new message is enqueued, it is added at the shard tail of a queue shard. In some embodiments, a shard tail reference 172-176 identifies the queue shard tail of the respective shard 102-106. For example, the shard tail reference may be a pointer into a current subshard 122, 138, and 152 (e.g. in volatile memory and/or in secondary storage). As used herein, the term "current subshard" refers to a subshard comprising the shard tail of a respective shard 102-106. When a current subshard becomes full, subsequent messages for the shard are enqueued into the next subshard allocated to the shard. For example, when the current subshard 122 of shard 102 is full, subshard 124 becomes the current subshard, and subsequent messages for shard 102 are stored in subshard 124. In some embodiments, when a particular shard 102 is associated with one or more active enqueuers that can enqueue messages into the particular shard 102, the current subshard 122 of the particular shard 102 is always cached in volatile memory to facilitate enqueue operations and dequeue operations.

Subshards 124-128, 140-148, and 154-170 are generated at a later point in time as additional messages are enqueued in the corresponding shards 102-106. In some embodiments, the volatile memory and/or secondary storage for a subshard may be pre-allocated, and/or allocated when a current subshard becomes full and a next current subshard is needed. Subshards 110-120, 130-136 and 150 are illustrated with a solid line to indicate that these subshards are full. The current subshards 122, 138, 152 are illustrated partially with a solid line and partially with a dashed line to indicate that these subshards are partially full. Future subshards 124-128, 140-148 and 154-170 are illustrated with a dashed line to indicate that these subshards do not contain messages.

At a logical level, a sharded queue, each shard in the queue, and each subshard in the queue's shards each correspond to a set of messages. When implemented on a computer system, corresponding data structures are generated and stored in memory and/or in secondary storage, as shall be described in greater detail hereinafter. As used herein, depending on the context in which the term appears, the term "subshard" may refer to a logical set of messages, the set of messages as stored in volatile memory (e.g. a "cached subshard"), and/or the set of messages as stored in secondary storage, (e.g. a set of rows in a queue table). As used herein, depending on the context in which the term appears, the term "shard" may refer to a logical set of messages and/or subshards, the set of messages as stored in volatile memory (e.g. one or more cached subshards), and/or the set of messages as stored in secondary storage, (e.g. a set of rows in a queue table).

Message Cache

The sharded queue 100 may be implemented in both volatile memory and secondary storage. As used herein, the term "cached subshard" refers to a representation of a subshard that is stored in memory, such as in a message cache. A representation of a cached subshard may also be stored in secondary storage, making the cached subshard persistent. In some cases, such as when the sharded queue 100 does not fit entirely in the message cache, a representation of one or more subshards may be stored only in secondary storage. When a message is enqueued in a subshard, the message is stored in at least one of a representation of the subshard in volatile memory and a representation of the subshard in secondary storage.

The message cache provides a fast in-memory access path to all queuing functionality including enqueue operations, dequeue operations, and notification operations. A message cache can store messages from one or more distinct queues, including one or more distinct sharded queues. When a queue operation is performed on a cached subshard, enqueuers and dequeuers do not need to scan or sort structures, such as database tables, in secondary storage. Compared to I/O operations, queue operations in memory have no disk latency. In some embodiments, all subshards with current activity are stored in the message cache to avoid costly SQL operations when there is sufficient room in the message cache. For example, in some embodiments, the current subshards 122, 138 and 152 of each shard 102-106 with existing enqueuers are always cached subshards.

Example System Architecture

Figure 4:
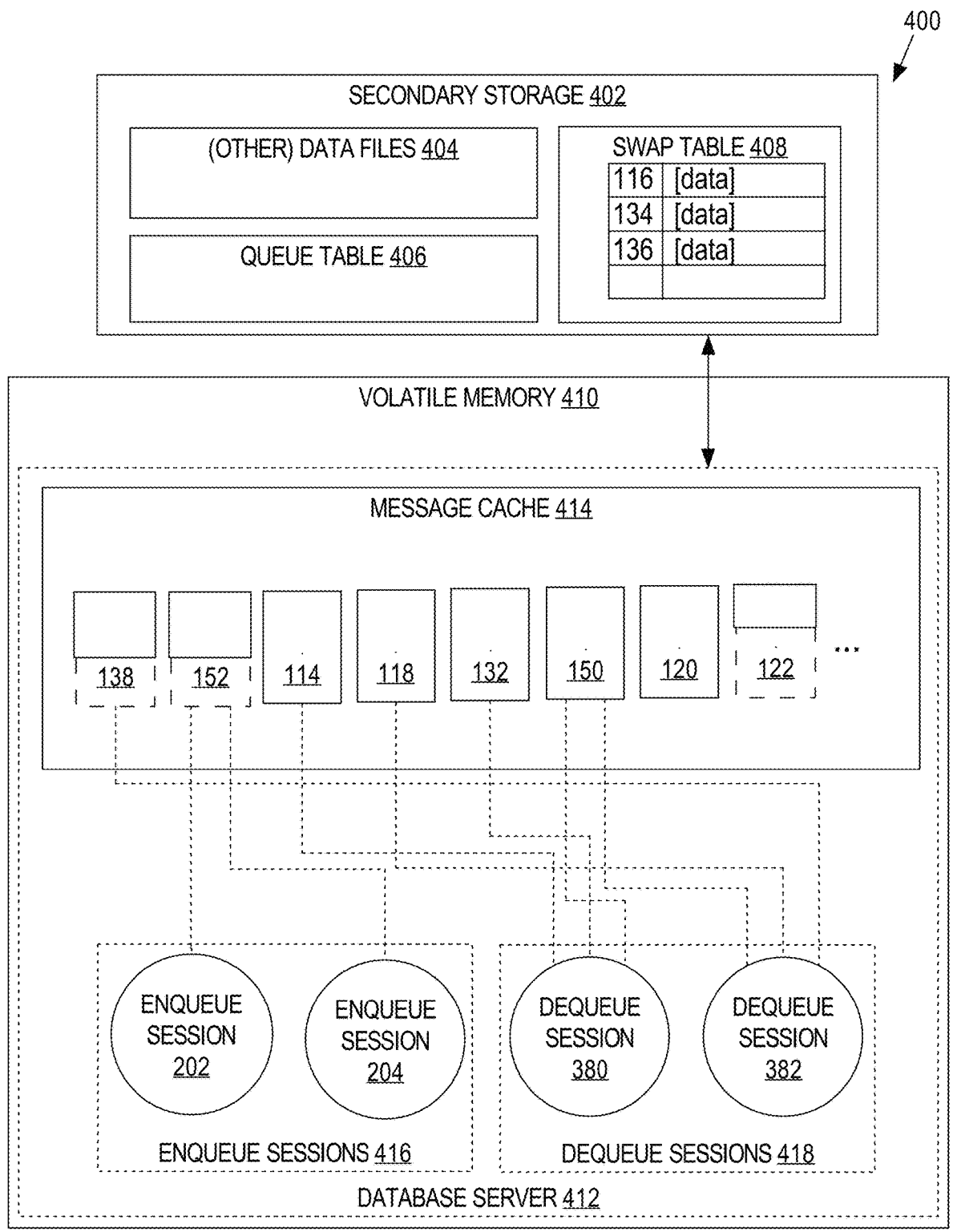
FIG. 4 is a block diagram depicting an example database system in accordance with one or more embodiments.

FIG. 4 is a block diagram depicting an example database system in accordance with one or more embodiments. Database system 400 includes database server 412. A database server governs and facilitates access to one or more databases, processing requests by clients to access the one or more databases. The database server 412 manages data files 404 corresponding to a database stored in secondary storage 402. The database server 412 also maintains persistent data corresponding to a sharded queue 100 in secondary storage 402, such as queue table 406. The database server 412 also maintains a message cache 414 in volatile memory 410. In some embodiments, the message cache 414 is maintained in a system global area (SGA) of the database system 400 that includes volatile memory 410 that is shared by all the processes of the database server 412.

The database server 412 maintains and manages a plurality of cached subshards in the message cache 414 to facilitate in-memory queue operations by the enqueue sessions 416 and dequeue sessions 418 for the sharded queue 100. As used herein, the term "session" refers to a connection to the database, which may include one or more processes of the database server 412 and/or one or more client processes. Although some embodiments are described in terms of enqueue sessions and dequeue sessions, the description also applies to enqueuers and dequeuers of a sharded queue, whether or not the enqueuer and/or dequeuer uses an enqueue session and/or a dequeue session to carry out queue operations.

Enqueuers

As used herein, the term "enqueuer" refers to any entity that adds messages to a sharded queue. For example, an enqueuer may be a process that enqueues messages to the sharded queue. An enqueue session is a connection that allows an enqueuer to access the sharded queue 100. For example, an enqueuer, such as a process, may enqueue a message in a particular shard of the sharded queue 100 via an enqueue session. As used herein the term "process" refers to an instance of a set of program instructions running in a computer. A process may have a virtual address space, executable code, open handles to system objects, a security context, a unique process identifier, environment variables, a priority class, minimum and maximum working set sizes, and/or one or more threads of execution.

Figure 2:
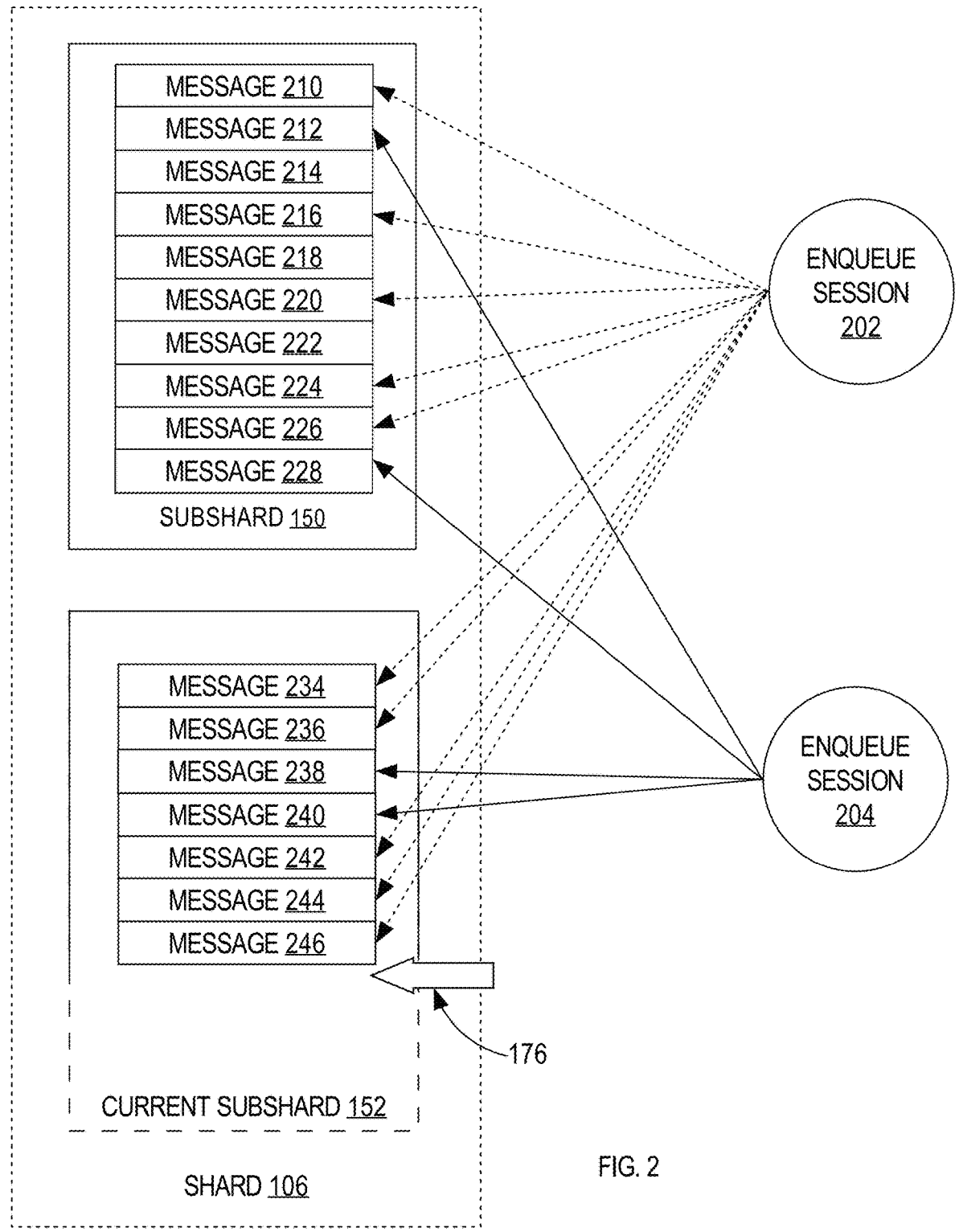
FIG. 2 is a block diagram depicting example enqueue sessions in accordance with one or more embodiments.

FIG. 2 is a block diagram depicting example enqueue sessions in accordance with one or more embodiments. Enqueue sessions 202-204 are assigned to (e.g. have enqueue affinity with) shard 106 of sharded queue 100. That is, all messages enqueued in the sharded queue 100 by enqueue sessions 202-204 are enqueued in shard 106 of the sharded queue 100.

Enqueue sessions 202-204 enqueue messages by adding messages 210-246 at the queue shard tail 176 of the current subshard 152 of shard 106. The messages 210-246 in shard 106 are stored in enqueue order with respect to any enqueue session 202-204 that is assigned to the shard 106. For example, message 210, enqueued by enqueue session 202, is enqueued before message 212, which is enqueued by enqueue session 204. Messages 210, 216, 220, 224, 226, 234, 236, 242-246 are enqueued by enqueue session 202, messages 212, 228, 238 and 240 are enqueued by enqueue session 204, and messages 214, 218 and 222 are enqueued by another enqueue session.

Dequeuers

As used herein, the term "dequeuer" refers to any entity that consumes messages from a sharded queue. For example, a dequeuer may be a process that dequeues messages from the sharded queue. To consume messages, a single dequeuer may use any number of dequeue sessions to consume messages from a single queue. A dequeue session is a connection that allows a dequeuer to access the sharded queue. In some embodiments, when a dequeuer has multiple dequeue sessions, the multiple dequeue sessions must coordinate consumption with the other dequeue sessions so that the same message is not consumed more than once by the same dequeuer.

Generally, any shard 102-106 of a sharded queue can potentially contain messages that must be consumed by any dequeuer of the sharded queue 100. Thus each dequeuer of the sharded queue 100 generally processes every shard 102-106 of the sharded queue 100 to dequeue the messages from the sharded queue 100. In some instances, a particular dequeue session may dequeue messages from only a subset of the shards of the sharded queue, which is described in greater detail in U.S. Patent Application Pub. No. 2014/0372486, U.S. Patent Application Pub. No. 2014/0372489, and U.S. Patent Application Pub. No. 2014/0372702.

Figure 3A:
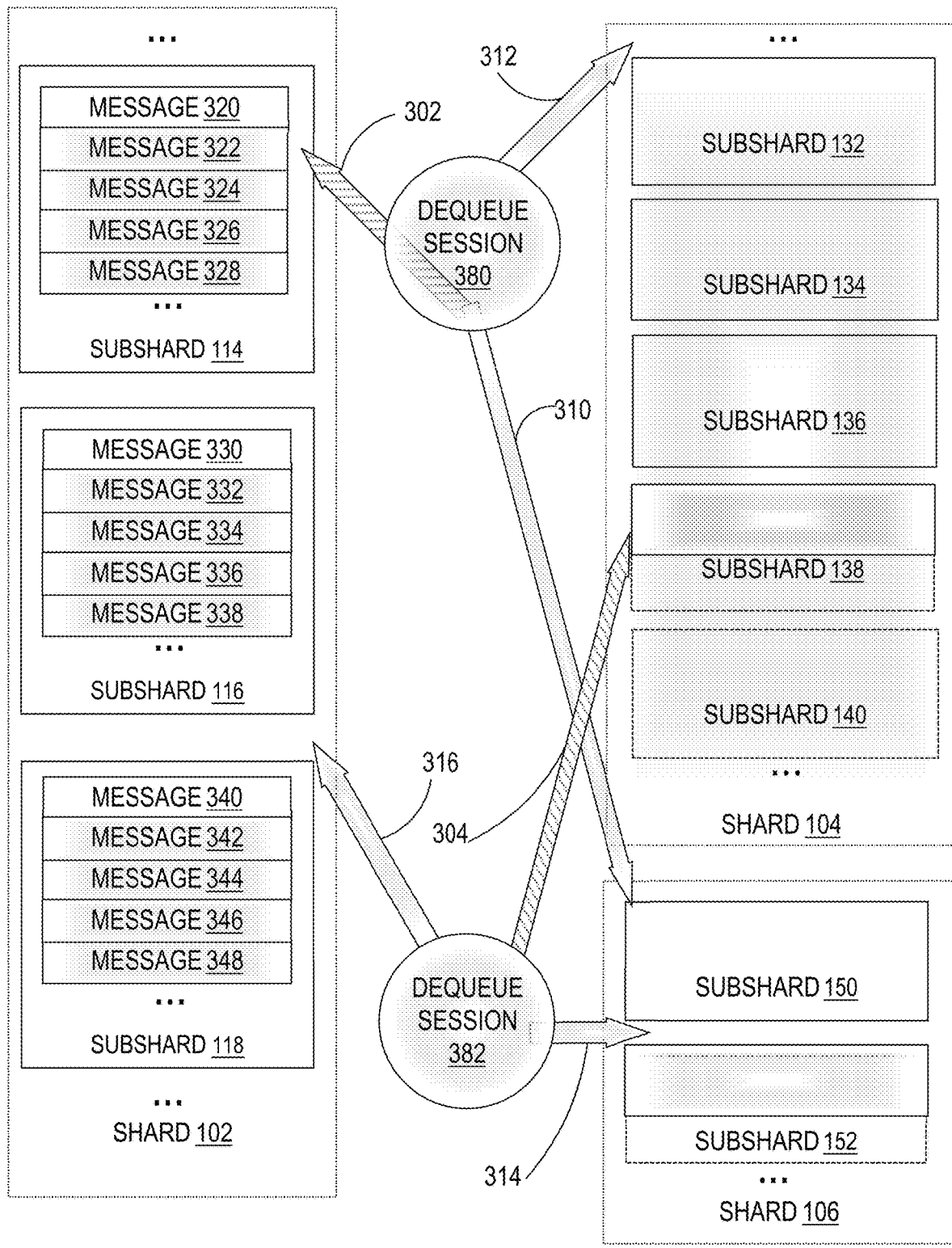
FIG. 3A is a block diagram depicting example dequeue sessions in accordance with one or more embodiments.

FIG. 3A is a block diagram depicting example dequeue sessions in accordance with one or more embodiments. A sharded queue may have one or more dequeuers. In the illustrated embodiment, sharded queue 100 has two dequeuers. Dequeue sessions 380-382 each correspond to a dequeuer of the sharded queue 100. Each dequeue session 380-382 dequeues messages from each shard 102-106.

When a sharded queue has multiple dequeuers, the dequeuers may function independently of each other and may dequeue at different positions in each shard 102-106 the sharded queue 100. In some embodiments, a dequeue session 380-382 dequeues a subset of messages from one shard 102 in enqueue order with respect to the shard 102, then switches to another shard 104 to dequeue messages from the other shard 104 in enqueue order with respect to the other shard 104. The order in which the dequeue sessions 380-382 visit the shards 102-106 of a sharded queue 100 may be determined based on a variety of factors. The order followed by each dequeue session 380-382 may be the same and/or different over time, and may be the same and/or different from other dequeue session 380-382. Furthermore, the number of messages and/or subshards processed from a particular shard 102-106 during a single turn may be the same and/or different, and may be adaptive. A simple scheme for visiting the shards 102-106 is a round-robin scheme.

In some embodiments, each dequeue session 380-382 keeps a current dequeue position 302-316 for each shard 102-106 to track dequeue progress in each shard 102-106. At the time represented in the illustrated embodiment, current dequeue position 302 indicates that dequeue session 380 is currently processing subshard 114 of shard 102, while current dequeue position 304 indicates that dequeue session 382 is currently processing subshard 138 of shard 104. In one or more examples described herein, the current dequeue position is shown to a level of detail that identifies a subshard in the corresponding shard. In some embodiments, the current dequeue position for a dequeuer (or dequeue session) on a shard includes a particular message offset within the subshard or another reference to a particular message within the subshard.

Current dequeue position 310 indicates that the next subshard in shard 106 that dequeue session 380 will process is subshard 150. Current dequeue position 312 indicates that the next subshard in shard 104 that dequeue session 380 will process is subshard 132. Current dequeue position 314 indicates that the next subshard in shard 106 that dequeue session 382 will process is subshard 152. Current dequeue position 316 indicates that the next subshard in shard 102 that dequeue session 382 will process is subshard 118.

In some embodiments, each dequeue session 380 completely processes a subshard in its entirety before proceeding, either to the next subshard in the current shard or the next subshard in a different shard. For example, dequeue session 380 will completely finish processing subshard 114 before proceeding to either subshard 116 of the same shard 102, subshard 132 of shard 104, or subshard 150 of shard 106. Dequeue session 382 will completely finish processing subshard 138 before proceeding to subshard 140 of the same shard 104, subshard 152 of shard 106, or subshard 118 of shard 102.

Queue Table

Figure 5:
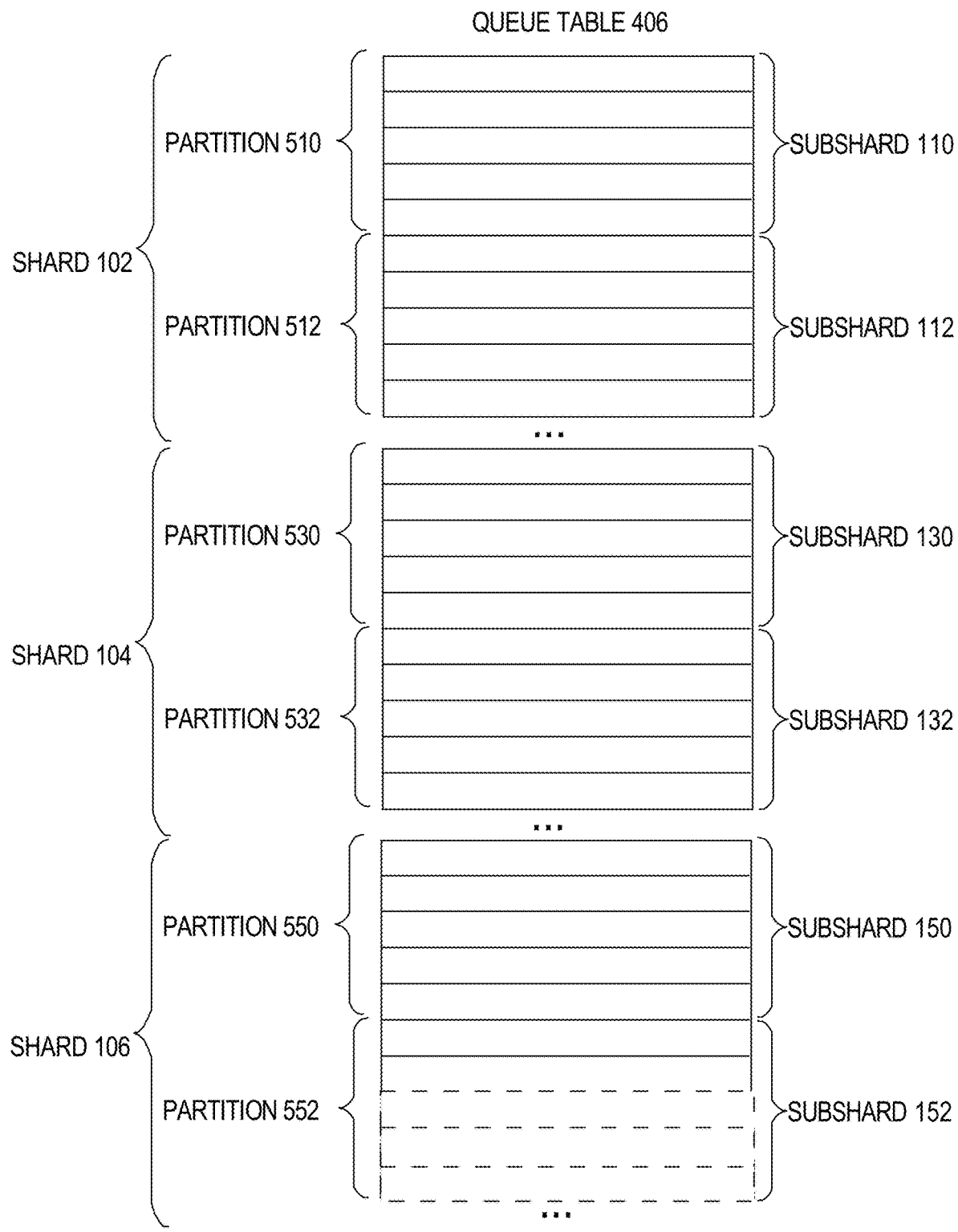
FIG. 5 is a block diagram depicting an example queue table in secondary storage in accordance with one or more embodiments.

FIG. 5 is a block diagram depicting an example queue table in secondary storage in accordance with one or more embodiments. Messages enqueued in the sharded queue 100 are persistently stored in the queue table 406 in secondary storage 402.

In some embodiments, each subshard of a given shard is assigned one or more queue table partitions 510-552 that have been assigned to the given shard. For example, shard 102 is assigned a set of partitions 510-512 of the queue table 406, and its subshards 102-122 are assigned to the queue table partitions 510-512 corresponding to shard 102; shard 104 is assigned a set of partitions 530-532 of the queue table 406, and its subshards 130-138 are assigned to the queue table partitions 530-532 corresponding to shard 104; and shard 106 is assigned a set of partitions 550-552 of the queue table 406, and its subshards 150-152 are assigned to the queue table partitions 550-552 corresponding to shard 106.

In some embodiments, a single queue table partition can be assigned to multiple subshards. In alternative embodiments, the shards are divided into subshards without respect to the partitioning of queue table 300. Thus, the relationship between subshards and queue table partitions may be one-to-many, one-to-one, many-to-one, or there may be no particular relationship at all. The number of partitions used by each shard may vary based on a variety of factors, including the rate at which enqueuers are enqueuing messages to each shard, and the rate at which dequeuers are dequeuing messages from each shard. Thus, the number of partitions in any given shard may vary over time, with new partitions being added when enqueuers run out of storage for new messages, and partitions being dropped as dequeuers finish dequeuing all messages in a partition.

In some embodiments, an insert operation, such as a SQL INSERT, is performed on the queue table 406 to enqueue a persistent message into the queue table 406. In some embodiments, a select operation, such as a SQL SELECT, is performed on the queue table 406 to dequeue a message from the queue table 406. Alternatively, in some embodiments, dequeuing is always and/or primarily performed from the message cache 414.

Message Cache Management

Message cache management is performed to determine a set of subshards to maintain in the message cache. In some embodiments, message cache management is performed at least in part by one or more background processes, such as daemon processes of the database server 412.

In an ideal situation, all dequeuers keep up with enqueuers, and any subshards that a dequeuer needs to process will fit in the message cache. However, when dequeuers do not keep up with enqueuers, the number of unprocessed subshards increases. Dequeue sessions 418 can fall behind such that they must dequeue from a subshard other than the current subshard of a particular shard, which may already be in the message cache to facilitate enqueue operations.

For example, referring to FIG. 3A, dequeue session 380 is behind in shards 102, 104 and 106, and dequeue session 382 is behind in shard 102. Dequeue session 382 is current in shard 104; as indicated by its current dequeue position 304 for shard 104, dequeue session 382 is currently dequeuing from shard 104 at its current subshard 138. Dequeue session 382 is also current in shard 106; as indicated by its current dequeue position 314 for shard 106, dequeue session 382 will begin dequeuing from shard 106 at its current subshard 152 when it visits shard 106 to dequeue messages.

To address this issue, mechanisms to evict and restore subshards in the message cache are implemented. Evicting and restoring allow queue operations to be performed in memory without limiting the size of the queue based on the message cache size. Message cache management involves determining when to evict specific subshards to secondary storage 402 from the message cache 414 and when to restore specific subshards to the message cache 414 from secondary storage 402. Evicting and restoring operations are described in greater detail hereinafter.

Evicting a Cached Subshard

As used herein, the term "evict" refers to moving a cached subshard from the message cache to secondary storage. After a subshard is evicted, the subshard is no longer a cached subshard. Evicting a cached subshard is performed when it is determined that the cached subshard will likely not be accessed soon. In some embodiments, eviction is performed in response to a determination that it is desirable to free up space in the message cache 414 and/or in volatile memory 410. For example, evictions may be performed when an amount of memory used by the message cache 414 reaches a threshold (e.g. 50% of available memory).

The eviction of a cached subshard may take a substantial amount of time and/or other computing resources, such as due to secondary storage I/O operations and/or the execution of database commands to write the subshard data to a database structure. For these reasons, evicting a cached subshard can potentially cause increased latency when performed by a dequeue session. In some embodiments, eviction is performed by one or more background processes.

In some embodiments, when a cached subshard is evicted, a representation of the subshard is stored in secondary memory in a swap table 408. For example, each subshard representation may be stored as a row in swap table 408. Swap table 408 includes rows that each include a representation of evicted subshards 116, 134 and 136. In some embodiments, the representation of the subshard stored in secondary memory is a binary representation of the corresponding cached subshard. In some embodiments, subshard memory chunks in the message cache 414 are directly copied into secondary storage 402, such as into a row of swap table 408. A message cache may have one or more swap tables 408. In some embodiments, a message cache stores messages from one or more distinct queues. In this case, the one or more distinct queues may share one or more swap tables 408 or may implement one or more private swap tables 408 that is specific to a subset of the one or more distinct queues.

As used herein, the term "eviction rate" refers to any quantitative value indicating a rate at which messages are evicted from the message cache. In some embodiments, the eviction rate is a quantitative value indicating a number of subshards 150-152 per unit time and/or an amount of time per subshard 150-152 that are evicted from the message cache 414.

Restoring a Subshard

As used herein, the term "restore" refers to moving a subshard from secondary storage to the message cache. After a subshard is restored, the subshard is a cached subshard, and queue operations may be performed on the cached subshard in memory.

When a previously evicted subshard is restored, the stored representation is used to generate the cached subshard in the message cache 414. For example, a binary representation of a stored subshard in the swap table 408 may be restored by reading the binary representation of the subshard from the swap table 408 into volatile memory 410. In some embodiments, subshard memory chunks in secondary storage 402 are directly copied into the message cache 414. Two different ways to restore a subshard, prefetching and unevicting, are described in greater detail hereinafter.

Prefetching a Subshard

As used herein, the term "prefetch" refers to restoring a previously evicted subshard in advance of any actual request to access the subshard, such as a request or instruction to perform a queue operation involving the subshard. An uncached subshard may be prefetched if there is room in the message cache and there is a good likelihood that a queue operation, such as a dequeue operation, will be performed on the subshard in the near future. In some embodiments, a previously evicted subshard is prefetched when it is determined that the subshard will be likely accessed within a timeframe.

Restoring a cached subshard may take a substantial amount of time, such as due to secondary storage I/O operations and/or the execution of database commands to retrieve the subshard data from a database structure. Because restoring a cached subshard can take a nontrivial amount of time, it can cause increased latency when performed by a dequeue session. In some embodiments, prefetching is performed by one or more background processes.

Unevicting a Subshard

As used herein, the term "unevict" refers to moving a subshard from secondary storage to the message cache upon access. For example, a previously evicted subshard may be restored in response to an actual request to access the subshard, such as when a dequeuer dequeues from a subshard that is not currently stored in the message cache.

When a subshard is restored in response to an actual request instead of in advance of a request, an I/O operation must first be completed in order to retrieve the subshard from secondary storage before responding to the request. Thus, it is desirable to minimize the occurrence of restoring a subshard in response to an actual request, such as by prefetching evicted subshards before an actual request.

Estimated Enqueue Rate

In some embodiments, message cache sizing is performed based on one or more estimated enqueue rates. In some embodiments, an enqueue rate is determined for each shard of a plurality of shards 102-106 of the queue 100. As used herein, the term "enqueue rate" refers to any quantitative value indicating a rate at which messages are enqueued in a particular shard by any enqueuer and/or enqueue session. For example, the enqueue rate may be any quantitative value indicating a number of messages 210-246 per unit time or an amount of time per message 210-246. In some embodiments, the enqueue rate is a quantitative value indicating a number of subshards 150-152 per unit time and/or an amount of time per subshard 150-152. As used herein, the term "estimated enqueue rate" refers to any forward-looking projection of an enqueue rate, such as an enqueue rate for a shard.

The estimated enqueue rate for a shard may be based on enqueue statistics over a period of time. For example, the estimated enqueue rate may be based on historical enqueue rates for the shard. In some embodiments, the estimated enqueue rate for a shard 106 is based on a number of messages enqueued and/or a number of subshards filled during a period of time.

In some embodiments, one or more enqueue statistics may be weighted to determine the estimated enqueue rate for a shard. For example, to calculate an estimated enqueue rate for a shard, more recent enqueue statistics collected for the shard may be weighted more heavily than less recent enqueue statistics collected for the shard. For example, the estimated enqueue rate may be based on a weighted sum of recent enqueue statistics for the shard. Alternatively and/or in addition, the estimated enqueue rate may be determined based on historical patterns over time (e.g. time of day, date, day of week, week, month, year, or any other historical pattern), historical workload statistics for the system, historical workload statistics for one or more enqueuers, administrator and/or user input, and any other factor that has predictive value with respect to a rate of enqueue messages. For example, short-term enqueue rate trends and/or long-term enqueue rate trends can be used to estimate future enqueue rates, such as periodic trends based on historical patterns over time.

In some embodiments, enqueuer-specific rate statistics are determined that are specific to one or more enqueuers and/or enqueue sessions, and these enqueuer-specific rate statistics are used to determine an estimated enqueue rate for a shard. For example, if a high-activity enqueue session 202 that accounts for a substantial portion of the enqueue activity in a particular shard 106 terminates, the estimated enqueue rate for the corresponding shard 106 may be updated to reflect the termination of the enqueue session 202.

Estimated Dequeue Rate

Figure 3B:
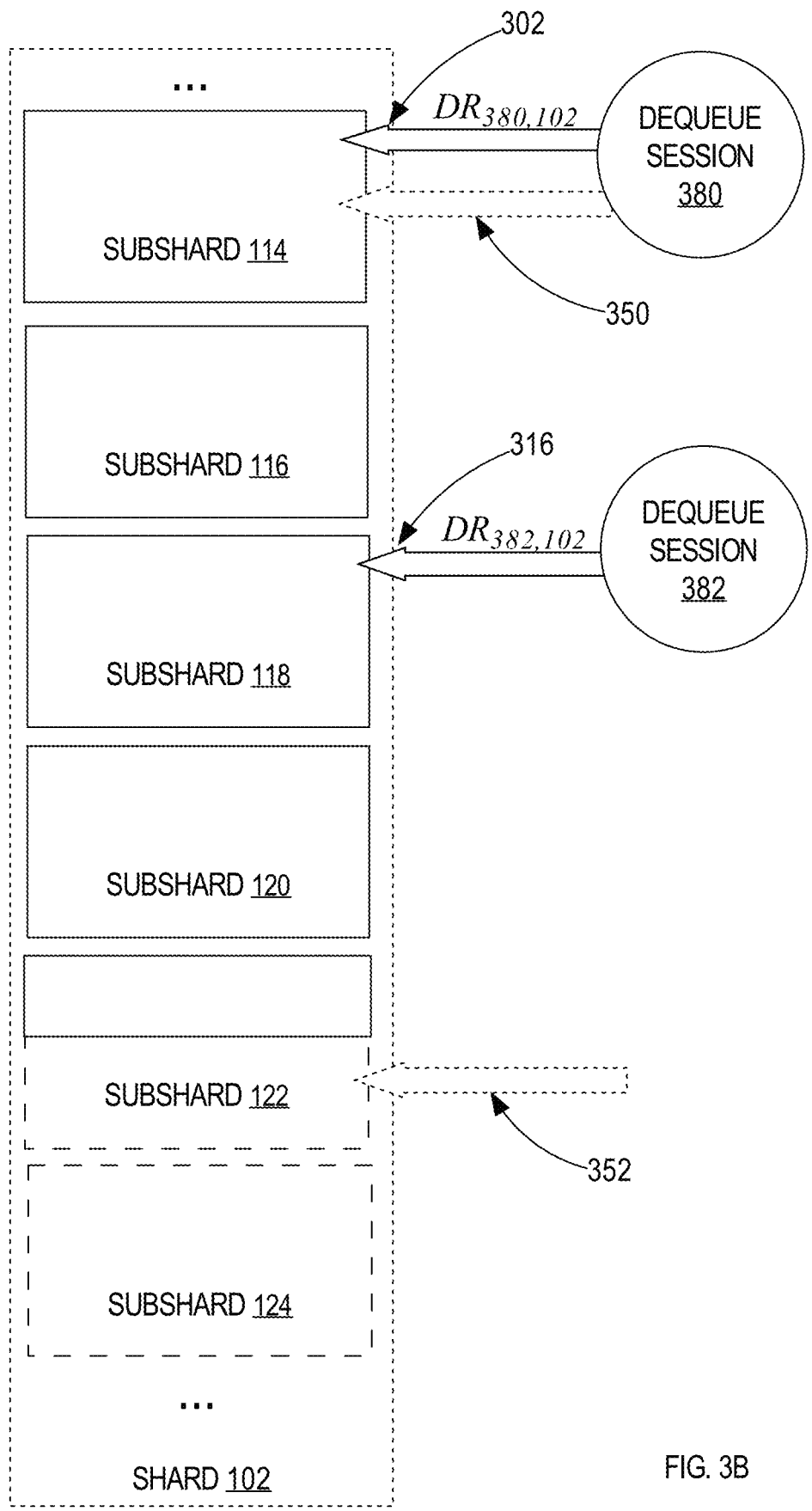
FIG. 3B is a block diagram depicting an example of estimated dequeue progress in accordance with one or more embodiments.

In some embodiments, message cache sizing is performed based on one or more estimated dequeue rates. FIG. 3B is a block diagram depicting an example of estimated dequeue progress within a timeframe in accordance with one or more embodiments. A dequeue rate is determined for one or more dequeuer-shard pairs. As used herein, the term "dequeuer-shard pair" refers to a single dequeuer of the one or more dequeuers and a single shard of a sharded queue. In the case that a dequeuer has more than one dequeue session, a dequeuer-shard pair may refer to either multiple dequeue sessions of the dequeuer, or a particular dequeue session of the dequeuer. The dequeuer-shard pairs for sharded queue 100 are <380:102>, <380:104>, <380:106>, <382:102>, <382:104> and <382:106>. In FIG. 3B, dequeuer-shard pairs <380:102> and <382:102> are shown.

As used herein, the term "dequeue rate" refers to any quantitative value indicating a rate at which messages are dequeued. For example, the dequeue rate may be any quantitative value indicating a number of messages 320-348 per unit time or an amount of time per message 320-348. In some embodiments, the dequeue rate is a quantitative value indicating a number of subshards 114-118 per unit time and/or an amount of time per subshard 114-118. As used herein, the term "estimated dequeue rate" refers to any forward-looking projection of a dequeue rate, such as a dequeue rate for a dequeuer-shard pair.

The dequeue rate of a dequeuer-shard pair may be any quantitative value indicating a rate at which messages are dequeued from a particular shard of a sharded queue by a particular dequeuer and/or dequeue session. Each dequeuer-shard pair may have a different dequeue rate. For example, dequeue session 380 may dequeue from shard 102 at a first dequeue rate, from shard 104 at a second dequeue rate, and from shard 106 at a third dequeue rate. Likewise, dequeue session 382 may dequeue from shard 102 at a fourth dequeue rate, from shard 104 at a fifth dequeue rate, and from shard 106 at a sixth dequeue rate.

The estimated dequeue rate for a dequeuer-shard pair may be based on dequeue statistics over a period of time. For example, the estimated dequeue rate may be based on historical dequeue rates of the dequeuer from the particular shard. In some embodiments, the estimated dequeue rate for a dequeuer-shard pair is based on a number of messages dequeued and/or a number of subshards processed during a period. The estimated dequeue rate for dequeuer-shard pair <380:102> is $DR_{380,102}$, and the estimated dequeue rate for dequeuer-shard pair <382:102> is $DR_{382,102}$.

In some embodiments, one or more dequeue statistics may be weighted to determine the estimated dequeue rate for a dequeuer-shard pair. For example, to calculate an estimated dequeue rate, more recent dequeue statistics collected for the particular dequeuer-shard pair may be weighted more heavily than less recent dequeue statistics collected for the particular dequeuer-shard pair. For example, the estimated dequeue rate may be based on a weighted sum of recent dequeue statistics for the dequeuer-shard pair. Alternatively and/or in addition, the estimated dequeue rate may be determined based on historical patterns over time (e.g. time of day, date, day of week, week, month, year, or any other historical pattern), historical workload statistics for the system, historical workload statistics for one or more dequeuers, administrator and/or user input, and any other factor that has predictive value with respect to a rate of dequeuing messages. For example, short-term dequeue rate trends and/or long-term dequeue rate trends can be used to estimate future dequeue rates, such as periodic trends based on historical patterns over time.

Rate Calculation and Recalculation

In operation, enqueue sessions and dequeue sessions can vary in performance over time. For example, network latency, resource unavailability, workload changes and other factors can cause changes in the estimated dequeue rate of a particular shard and/or the estimated enqueue rate of a particular dequeuer-shard pair. Thus, in some embodiments, enqueue statistics, dequeue statistics, estimated enqueue rates, and estimated dequeue rates are maintained and updated continuously during operation.

In some embodiments, the estimated dequeue rates for dequeuer-shard pairs may be periodically updated, such as based on a period of time, or based on a number of messages and/or subshards processed. In some embodiments, each dequeue session is configured to completely process a subshard in its entirety before proceeding to another subshard.

In some embodiments, an update to an estimated dequeue rate for a dequeuer-shard pair is made when a dequeue session begins dequeuing the messages in a subshard of the corresponding shard, finishes dequeuing the messages in a subshard of the corresponding shard, and/or otherwise transitions from a subshard to another subshard of the corresponding shard. Alternatively and/or in addition, an update to the estimated dequeue rate may be made when the dequeue session transitions from a subshard in one shard to a subshard in a different shard. In some embodiments, a dequeue session 380-382 or another element of the database server 412 updates and/or triggers an update of the estimated dequeue rate for a dequeuer-shard pair when the dequeue session 380-382 begins or finishes processing a subshard (or a set number of subshards) in the specified shard.

In some embodiments, the estimated enqueue rate for a shard may be periodically updated, such as based on a period of time, or based on a number of messages and/or subshards processed. In some embodiments, an update to an estimated enqueue rate for a shard pair is made when a subshard of the shard is full, when an empty subshard is created and/or obtained for the shard, and/or when there is any other transition between subshards with respect to enqueuing.

Estimated Restore Overhead Data

As used herein, the term "restore overhead data" refers to any data corresponding to the overhead of restoring subshards to the message cache. Restore overhead data may include one or more statistics that reflect the cost of restoring subshards to the message cache, including time and/or resources required to perform restore operations. The restore overhead data may include one or more metrics and/or statistics that directly reflect such cost/s, and/or correlate to such cost/s. As used herein, the term "estimated restore overhead data" refers to any forward-looking projection of restore overhead data.

Estimated Uneviction Rate

The estimated restore overhead data may be based on one or more estimated rates at which messages are restored to the message cache. In some embodiments, the estimated restore overhead data includes, or is based on, an estimated uneviction rate. As used herein, the term "uneviction rate" refers to any quantitative value indicating a rate at which messages are unevicted to the message cache, or restored upon access, such as in response to an actual request to dequeue a corresponding message. In some embodiments, the uneviction rate is a quantitative value indicating a number of subshards 150-152 per unit time and/or an amount of time per subshard 150-152 that is unevicted.

As used herein, the term "estimated uneviction rate" refers to any forward-looking projection of an uneviction rate, including an uneviction rate of a particular shard and/or the uneviction rate of a message cache. In the context of a particular dequeuer, the estimated uneviction rate for the particular dequeuer is any quantitative value indicating an estimated rate at which the dequeuer causes messages and/or subshards to be unevicted from secondary storage into the message cache. In the context of a particular shard, the estimated uneviction rate for the particular shard is any quantitative value indicating an estimated rate at which all dequeuers of the shard cause messages and/or subshards to be unevicted from secondary storage into the message cache. In the context of a particular dequeuer-shard pair, the estimated uneviction rate for the particular dequeuer-shard pair is any quantitative value indicating an estimated rate at which the corresponding dequeuer causes messages and/or subshards of the corresponding shard to be unevicted from secondary storage into the message cache.

In the context of a message cache, the estimated uneviction rate for the message cache is any quantitative value indicating an estimated rate at which messages and/or subshards from any shard, including from multiple shards, are unevicted from secondary storage into the message cache. The estimated uneviction rate for the message cache may be based on estimated uneviction rates for one or more dequeuers, estimated uneviction rates for one or more shards, and/or estimated uneviction rates for one or more dequeuers-shard pairs. In one embodiment, the estimated uneviction rate for a message cache is generated based on the estimated uneviction rate of each dequeuer, such as by summing the estimated uneviction rates of each dequeuer.

In some embodiments, dequeuers and/or dequeuer-shard pairs are classified, and different classifications thereof are treated differently when determining the estimated restore overhead data. For example, a message cache model may apply different calculations to different classifications of dequeuers and/or dequeuer-shard pairs. The classification of dequeuers and/or dequeuer-shard pairs, and the usage of such classifications, shall be described in greater detail hereinafter.

Estimated Prefetching Rate

In some embodiments, the estimated restore overhead data includes, or is based on, an estimated prefetching rate. As used herein, the term "prefetching rate" refers to any quantitative value indicating a rate at which messages are prefetched, or restored in advance of any actual request to access the message. In some embodiments, the prefetching rate is a quantitative value indicating a number of subshards 150-152 per unit time and/or an amount of time per subshard 150-152 that is restored in advance of any actual request to access the subshard.

Classifying Dequeuers and/or Dequeuer-Shard Pairs

When generating estimated restore overhead data, different calculations may be applied to different classifications of dequeuers and/or dequeuer-shard pairs. For example, a dequeuer may be classified based on a state of a computing device on which the dequeuer resides, a network bandwidth and/or other resources available to the dequeuer, a pending workload of the dequeuer, and/or other factors.

In some embodiments, each dequeuer-shard pair is classified. That is, a particular dequeuer may belong to a first class with respect to a first shard, and may belong to a different class with respect to a second shard. For example, the dequeuer shard pairs <380:102>, <380:104>, and <380:106> may be classified differently in some embodiments that classify dequeuer-shard pairs.

In some embodiments, a change to an estimated enqueue rate for a particular shard triggers an update operation that determines an updated classification for dequeuer-shard pairs that include the particular shard. Alternatively and/or in addition, a change to an estimated dequeue rate for a particular dequeuer and a particular shard may trigger an update operation that determines an updated classification for the dequeuer-shard pair. In some embodiments, a change to an estimated enqueue rate of one or more shards, a change to an estimated dequeue rate of one or more dequeuer-shard pairs, a change to a classification of one or more dequeuers, and/or a change to a classification of one or more dequeuer-shard pairs may trigger an update operation that determines an updated message cache size based on the changed data. Alternatively and/or in addition, one or more of the update operation described herein may be performed periodically.

Classification: On-Time Dequeuers and Lagging Dequeuers

In some embodiments, determining the estimated restore overhead data is based on classification of dequeuer-shard pairs into on-time dequeuers for the corresponding shard and lagging dequeuers for the corresponding shard. As used herein, the term "on-time dequeuer" refers to a dequeuer that keeps up with enqueue activity on the respective shard. For example, a dequeuer may be classified as an on-time dequeuer with respect to a particular shard if the estimated dequeue rate of the dequeuer-shard pair (e.g. the estimated dequeue rate of the dequeuer from the corresponding shard) is greater than or equal to the estimated enqueue rate of the shard. As used herein, the term "lagging" refers to a dequeuer that does not keep up with enqueue activity on the respective shard. For example, a dequeuer may be classified as a lagging dequeuer with respect to a particular shard if the estimated dequeue rate of the dequeuer-shard pair (e.g. the estimated dequeue rate of the dequeuer from the corresponding shard) is less than the estimated enqueue rate of the shard.

The classification of one or more dequeuers and/or one or more dequeuer-shard pairs may be updated. For example, if it is determined during runtime that an estimated dequeue rate of a dequeuer-shard pair and/or the estimated enqueue rate of the corresponding shard has changed, the estimated dequeue rate and the estimated enqueue rate may be compared to determine if the classification of the dequeuer-shard pair has changed (e.g. from an on-time dequeuer to a lagging dequeuer or vice versa). In some embodiments, an update is performed periodically, in response to one or more rate changes, and/or in response to a rate change that exceeds a particular threshold.

Determining Estimated Restore Overhead Data Over a Range

In some embodiments, estimated restore overhead data is determined over a range of candidate message cache sizes. For example, the estimated restore overhead data may be determined for a plurality of message cache sizes from a lower-bound size to an upper-bound size, which shall be described in greater detail hereinafter.

In some embodiments, the estimated restore overhead data is generated for individual message cache sizes over the range of candidate message cache sizes, which may be spaced out at regular or irregular size intervals. The size of the message cache may be defined as a number of subshards that the message cache can accommodate. Although some examples described herein refer to generating uneviction rates for each message cache size in the range by single-subshard intervals, any other estimated restore overhead data may be generated for any plurality of message cache sizes within the range of candidate message cache sizes.

In some embodiments, the estimated restore overhead data includes an estimated uneviction rate that is calculated for all message cache sizes in a range. After a lower-bound size and an upper-bound size is determined, the estimated uneviction rate for each message cache size, such as by beginning with the lower-bound size and incrementing the message cache size by one unit of memory, such as by one subshard, and assigning the new unit of memory to the dequeuer whose estimated uneviction rate would be reduced the most. Example procedures for calculating an estimated uneviction rate for a dequeuer and for assigning an incremental unit of memory to a dequeuer in accordance with one or more embodiments are described in greater detail hereinafter.

Lower-Bound Size

In some embodiments, the lower-bound size is the size of the smallest message cache that still allows every queue operation to be performed in memory without waiting for other queue operations to complete. For example, the lower-bound size may correspond to the smallest message cache that can accommodate, for each shard, subshards that the one or more enqueuers is actively enqueuing to, and subshards that the one or more dequeuers is actively dequeuing from. That is, the current subshard of each shard with active enqueuers should be in the message cache so that all enqueuers can perform enqueue operations in memory on a subshard in the message cache. The smallest message cache also stores up to one subshard for each dequeuer so that all dequeuers can perform dequeue operations in memory on a subshard in the message cache. The actual number of subshards in memory for the dequeuers may be less than the number of dequeuers, such as when multiple dequeuers dequeue from the same subshard, and/or when one or more dequeuers dequeue from the current subshard of a shard that is already in the message cache to facilitate enqueue operations.

In some embodiments, the lower-bound size is determined based on an assumption that at least a subset of the dequeuers do not dequeue from the same subshard, and thus each require their own subshard in the memory cache. For example, the lower-bound size may be determined based on an assumption that lagging dequeuers do not dequeue from the same subshard, and thus each require their own subshard in the memory cache. That is, if two lagging dequeuers are accessing the same subshard, the lower-bound size will still include two subshards for the two lagging dequeuers.

Figure 6A:
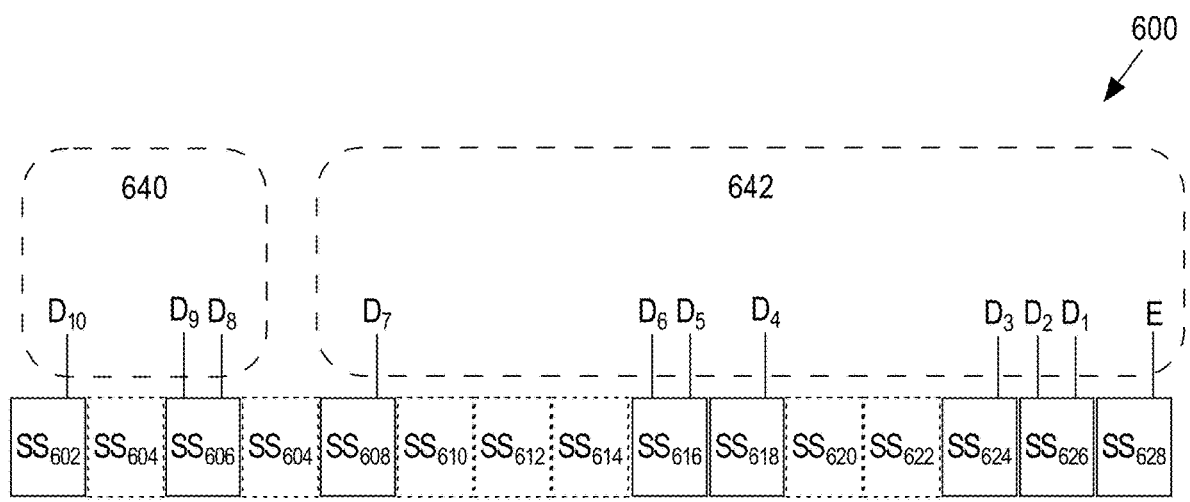
FIG. 6A is a block diagram depicting an example shard and subshards thereof that are accounted for in a lower-bound size of the message cache, in accordance with one or more embodiments.

FIG. 6A is a block diagram depicting an example shard and subshards thereof that are accounted for in a lower-bound size of the message cache, in accordance with one or more embodiments. Shard 600 is a shard of a sharded queue. Shard 600 includes 15 subshards. $SS_{628}$ is the current subshard of shard 600. Enqueuer E is currently enqueuing to $SS_{628}$. In some embodiments, one subshard is included in the lower-bound size for each shard with active enqueuers. Thus, in the given example, the lower-bound size includes space for storing subshard $SS_{628}$.

Dequeuers $D_1$-$D_{10}$ are currently dequeuing from subshards $SS_{602}$, $SS_{606}$, $SS_{608}$, $SS_{616}$, $SS_{618}$, $SS_{624}$, $SS_{626}$ and $SS_{628}$. Dequeuers $D_1$-$D_7$ are on-time dequeuers, and dequeuers $D_8$-$D_{10}$ are lagging dequeuers 640. If the lower-bound size is determined based on the worst-case assumption that each dequeuer is accessing a different subshard, the lower-bound size would include a subshard for each dequeuer $D_1$-$D_{10}$, or 10 subshards in addition to subshard $SS_{628}$ for enqueuer E. In this case, the lower-bound size is 11 subshards.

Alternatively, if the lower-bound size is determined based on the actual number of subshards being accessed by the dequeuers, the lower-bound size would include space for storing subshards $SS_{602}$, $SS_{606}$, $SS_{608}$, $SS_{616}$, $SS_{618}$, $SS_{624}$, $SS_{626}$ and $SS_{628}$. In this case, the lower-bound size is 8 subshards.

In some embodiments, the lower-bound size is determined based on the actual number of subshards currently accessed by on-time dequeuers 642, while, for lagging dequeuers 640, the assumption is made that each lagging dequeuer 640 accesses a different subshard. That is, if two on-time dequeuers are accessing the same subshard, the lower-bound size will only include one subshard for the two on-time dequeuers. If a dequeuer is dequeuing from the current subshard $SS_{628}$ and the current subshard $SS_{628}$ is already included due to active enqueuers E, the current subshard is only counted once. Given this scheme, the lower-bound size would include space for storing 3 subshards for the 3 lagging dequeuers 640 (even though only subshards $SS_{602}$ and $SS_{606}$ are currently accessed by the lagging dequeuers 640), as well as the subshards $SS_{608}$, $SS_{616}$, $SS_{618}$, $SS_{624}$, $SS_{626}$ and $SS_{628}$ that are accessed by dequeuers $D_1$-$D_7$ and enqueuer E.

Although the given example illustrates one shard 600 of a particular sharded queue, the sharded queue may include multiple shards. The lower-bound size for the message cache may include space for subshards corresponding to other shards of the sharded queue. Furthermore, the lower-bound size may include space for subshards from other sharded queues with one or more shards. That is, one message cache may be implemented for multiple sharded queues.

Upper-Bound Size

In some embodiments, the upper-bound size for a message cache is a largest message cache size for which estimated restore overhead data will be determined. The upper-bound size may be dynamically set. For example, the upper-bound size may be determined based on one or more properties of the message cache that change over time, such as a current and/or recent state of the message cache.

In some embodiments, the upper bound size of the message cache accommodates, for a shard, subshards that the one or more enqueuers is actively enqueuing to, subshards that the set of lagging dequeuers is actively dequeuing from, and subshards that the set of on-time dequeuers will dequeue from. For example, the upper-bound size may include, for a set of dequeuers with an estimated dequeue rate from the shard that is greater than or equal to the estimated enqueue rate of the shard, any subshard that the set of dequeuers have not finished dequeuing from. Under this scheme, subshards that are not yet processed by an on-time dequeuer of a particular shard are never evicted, so no restore overhead should be incurred by the on-time dequeuers with respect to the particular shard.

Figure 6B:
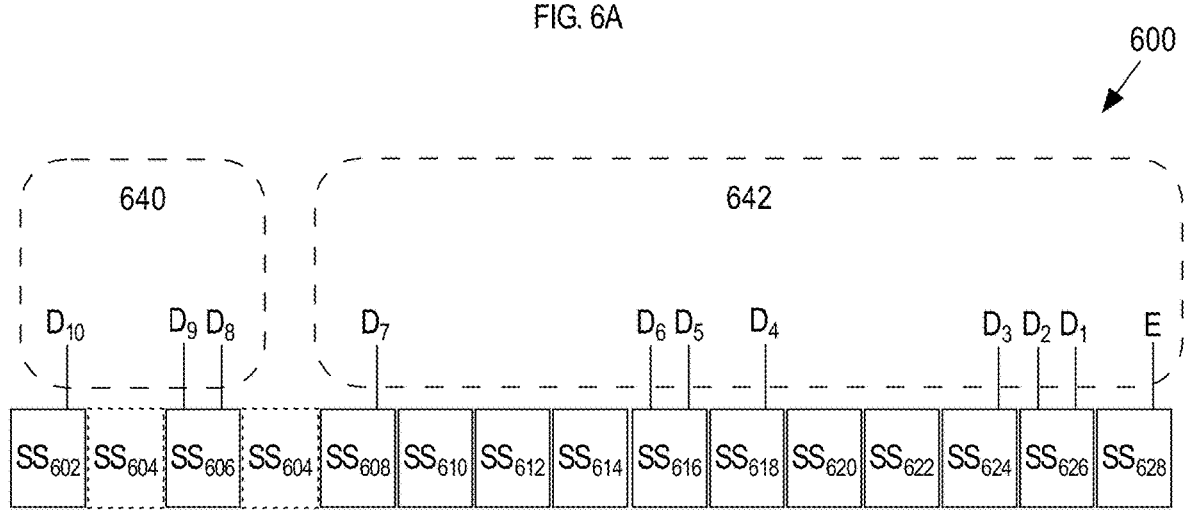
FIG. 6B is a block diagram depicting an example shard and subshards thereof that are accounted for in an upper-bound size of the message cache, in accordance with one or more embodiments.

FIG. 6B is a block diagram depicting an example shard and subshards thereof that are accounted for in an upper-bound size of the message cache, in accordance with one or more embodiments. Because dequeuers $D_1$-$D_7$ are on-time dequeuers 642, the upper-bound size includes space for subshards $SS_{608}$-$SS_{628}$, which are the on-time dequeuers 642 will dequeue from now or in the future. For the lagging dequeuers $D_8$-$D_{10}$, the upper-bound size includes space for subshards that the set of lagging dequeuers 640 is actively dequeuing from, $SS_{602}$ and $SS_{606}$. In some embodiments, the upper-bound size is determined based on an assumption that the lagging dequeuers 642 are each accessing a different subshard. For example, although only $SS_{602}$ and $SS_{606}$ are currently accessed, the upper-bound size may include space for 3 subshards because there are 3 lagging dequeuers.

This scheme may be applied to each shard of a plurality of shards of a sharded queue. The set of on-time dequeuers for a first shard may be different than the set of on-time dequeuers for a second shard. In some embodiments, the upper bound size of the message cache accommodates, for each shard of a plurality of shards of a sharded queue, subshards that on-time dequeuers will dequeue from. The upper-bound size for the message cache may include space for subshards corresponding to other shards of the sharded queue. Furthermore, the upper-bound size may include space for subshards from other sharded queues with one or more shards.

Generation of Estimated Restore Overhead Data Over a Range

In some embodiments, the estimated restore overhead data includes an estimated uneviction rate that is determined for each candidate size in a range of message cache sizes from a lower-bound size to an upper-bound size. The lower-bound size is a smallest message cache size for which estimated restore overhead data will be determined, while the upper-bound size is a largest message cache size for which estimated restore overhead data will be determined.

An example technique for generating estimated restore overhead data over a range of sizes is described in greater detail. Although the example is described with respect to an incremental unit of memory equal to a subshard, the technique may be adapted to other incremental units of memory. Using the estimated enqueue rates for the shards and the estimated dequeue rates for the dequeuer-shard pairs, it is possible to implement a message cache model that uses closed-form formulas rather than relying on a complex simulation. The example technique uses a message cache model of variable size, in subshards, which are reserved for particular subscriber-shard pairs.

A number of simplifying assumptions may be made in the message cache model. In some embodiments, an assumption is made that the estimated enqueue rates of each shard and the estimated dequeue rate of each dequeuer-shard pair, as most recently calculated, will remain constant. An assumption may also be made that lagging dequeuers never dequeue from the same subshard at the same time. That is, even if two lagging dequeuers of a particular shard are currently dequeuing from the same subshard of the particular shard, the model will count the two lagging dequeuers as each requiring a separate subshard to dequeue from with respect to the particular shard. An assumption may also be made that on-time dequeuers always maintain the same distance from the tail of the queue shard, even if its estimated dequeue rate is different than the estimated enqueue rate for the queue shard. An assumption may also be made that enqueuer/s on a shard and on-time dequeuers that keep up with enqueue activity move together such that, when enqueue activity moves to a new current subshard of the shard, each on-time dequeuer is modeled as dequeuing from the next subshard for the respective dequeuer. These simplifying assumptions may be used in any combination, along with other assumptions or not. Alternatively and/or in addition, one or more of these simplifying assumptions may be removed, and the message cache model may be modified to account for these factors.

Beginning at the lower-bound size, the message cache model assigns a subshard to each dequeuer-shard pair and each current subshard for shards with active enqueuers, taking into account any simplifying assumptions described herein. At a particular message cache size, the estimated uneviction rate for the particular size is determined based on the estimated uneviction rate for each dequeuer-shard pair, such as by summing the estimated uneviction rates for each dequeuer-shard pair. The estimated uneviction rate for each dequeuer-shard pair is $E*(N-M)/(N-1)$, where E is the enqueue rate on the shard, M is the number of subshards currently assigned to the dequeuer in the message cache model, and N is the number of subshards the current shard is behind its predecessor, or the next dequeuer that is immediately in front of the dequeuer in the shard. If there are no dequeuers on a shard between a given dequeuer and the enqueuers on that shard, then the predecessor for the given dequeuer is the set of enqueuers on the shard.

Then, the size of the message cache model is incremented by the unit of memory. For example, the size of the message cache model may be increased by one subshard. In some embodiments, the subshard is assigned to the subscriber-shard pair that maximizes a parameter. For example, the subshard may be assigned to the next subscriber-shard pair that would reduce the estimated uneviction rate of the subscriber-shard pair (and thus the uneviction rate of the message cache in some message cache models) the most. In some embodiments, the subshard of the message cache model is assigned to the subscriber-shard pair at the top of the ordered list ordered by E/N−1, where E is the enqueue rate on the shard and N is the number of subshards the subscriber is behind its predecessor. When any dequeuer-shard pair is assigned a number of subshards in the message cache model that is equal to the number of subshards the dequeuer is behind its predecessor in the message cache, the dequeuer-shard pair is removed from the ordered list since the dequeuer will no longer cause any unevictions.

After each incremental size increase and assignment of memory in the message cache to a subscriber-shard pair, the estimated uneviction rate for the new message cache size is recalculated. In some embodiments, the estimated uneviction rate is incrementally calculated, such as by calculating a change in the uneviction rate for the subscriber-shard pair that was assigned the new increment of memory.

The size of the message cache model is incrementally increased until the upper-bound size is reached. In some embodiments, at the upper-bound size, each on-time subscriber of a particular shard (in the list ordered by E/(N−1)) is assigned an adequate number of shards such that no evictions are necessary for any subshard that an on-time subscriber must process.

Preferred Message Cache Size

A preferred message cache size is determined based on the estimated restore overhead data. The preferred message cache size may be computed a variety of ways. For example, the preferred message cache size may be a threshold value. In some embodiments, the preferred message cache size is the smallest message cache size that achieves a threshold reduction (such as 80%) in estimated uneviction rates for dequeuers that keep up, or for any other classification/s of dequeuers. In some embodiments, the preferred message cache size is a minimum message cache size that meets a particular performance requirement, such as a fixed performance service level agreement (SLA) for database queuing. In some embodiments, the preferred message cache size is a minimum message cache size to meet a threshold value or performance requirement plus an additional margin. For example, the preferred message cache size may be a minimum message cache size that meets a particular performance requirement plus an additional percentage or an additional amount to increase the likelihood that the particular performance requirement is met.

In some embodiments, graph analysis is used to determine a preferred message cache size. For example, the preferred message cache size may be based on calculating "knee" in the function or curve that describes the estimated restore overhead data. For example, the curve may be fitted to a plot of the estimated uneviction rate for each message cache size. Generally, the term "knee" refers to a point at which the relative cost to increase some tunable parameter is no longer worth the corresponding performance benefit, and often involves the analysis of the first and/or second derivative of a function or curve. Although a known mathematical concept, there is no broadly-accepted definition or mathematical consensus. However, the techniques described herein may be adapted to incorporate any definition of a knee or another optimal point in the curve.

After the preferred message cache size is determined, the message cache size may be dynamically set to the preferred message cache size during runtime. Alternatively and/or in addition, the message cache size may be dynamically set to the preferred message cache size within certain constraints and/or factors, such as a maximum message cache size, a minimum message cache size, an amount of available system memory, or other factors. Alternatively and/or in addition, the size of the message cache may be automatically set based on a plurality of recent preferred message cache sizes. Alternatively and/or in addition, one or more preferred message cache sizes may be presented to a user, and the size of the message cache may be changed based on user input. In some embodiments, the estimated restore overhead data, such as the estimated uneviction rate for each message cache size at a particular point in time, are available as rows in a database security view.

The techniques described herein for determining a size of the message cache based on the estimated restore overhead data may be performed during runtime. For example, determining the estimated restore overhead data and determining the preferred message cache size may be concurrent with enqueuing the plurality of messages and dequeuing the plurality of messages, and may be run on a current state of the one or more queues using the message cache. Alternatively and/or in addition, the message sizing techniques can be performed periodically during runtime, as well as on historical queue data and/or hypothetical or sample queue data.

Alternatives and/or Additions

In some embodiments, the estimated restore overhead data is based on the estimated uneviction rate/s, the estimated prefetching rate/s, and/or a combination thereof.

There are several ways to model enqueuers and dequeuers switching from one subshard to another subshard.

One way is to multiply the MIN, MAX, and PREFERRED caches sizes by an appropriate adjustment factor (e.g., 1.1 for a 10% adjustment or 1.2 for a 20% adjustment).

Another way is to require two adjacent subshards per queue shard for enqueuers ("current subshard" and "next subshard" which transforms to "previous subshard" and "current subshard") and two adjacent subshards for each subscriber-shard pair when determining the MIN size. Then the formulas become $E*(N-M)/(N-2)$ and $E/(N-2)$. M begins at 2 rather than 1. A subscriber-shard pair with N=1 or N=2 is ignored by the cache sizing algorithm once MIN is determined because the uneviction rate for the subscriber-shard pair is zero.

EXAMPLE PROCESSES

Figure 7:
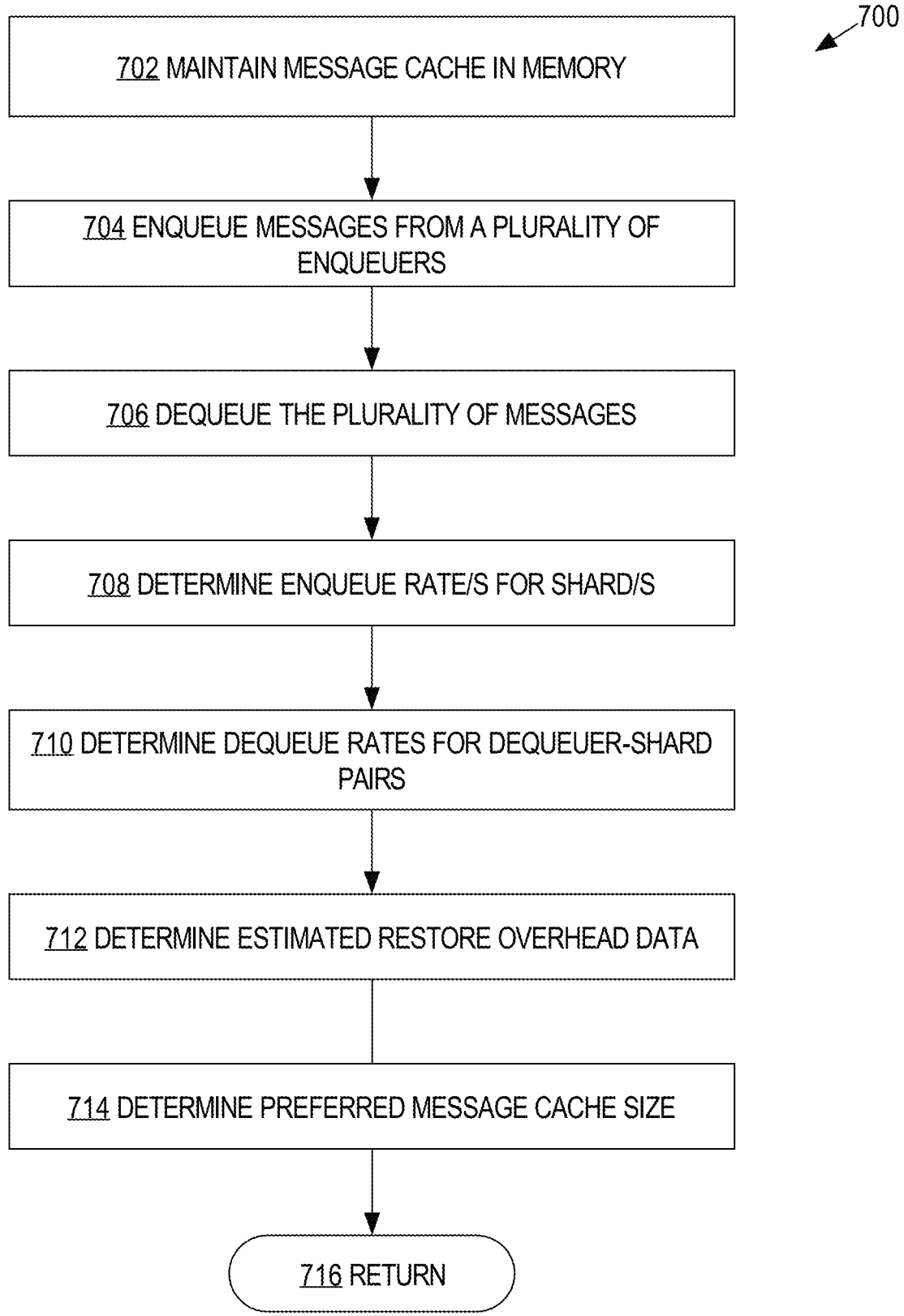
FIG. 7 is a flow diagram that illustrates an example process for implementing a dynamically-sized message cache in accordance with one or more embodiments.

FIG. 7 is a flow diagram that illustrates an example process for implementing a dynamically-sized message cache in accordance with one or more embodiments. Process 700 may be performed by one or more computing devices and/or processes thereof. For example, one or more blocks of process 700 may be performed by computing device 900.

In some embodiments, one or more blocks of process 700 are performed by a database system, such as database system 400.

At block 702, a message cache is maintained in memory. The message cache is configured to store a plurality of cached subshards of a queue. The cached subshards correspond to a set of subshards of the sharded queue that are stored in memory to facilitate queue operations. In some embodiments, one message cache is configured to store a plurality of cached subshards that includes subshards from multiple queues. The message cache may be maintained throughout process 700 in accordance with one or more embodiments described herein.

At block 704, a plurality of messages from one or more enqueuers are enqueued in the queue. The queue includes at least one shard, each shard comprising a plurality of subshards. When a particular message is enqueued, the particular message is enqueued in a current subshard of a particular shard, which includes storing the particular message in a cached subshard in the message cache that corresponds to the current subshard. Messages may be enqueued throughout process 700 in accordance with one or more embodiments described herein.

At block 706, the plurality of messages is dequeued from the queue by one or more dequeuers. The dequeuers each dequeue messages from the subshards of a particular shard in dequeue order by processing the subshards of a particular shard in order. In some embodiments, all dequeue operations are performed on cached subshards. That is, before a dequeue operation is performed on a particular subshard, if the particular subshard is not a cached subshard, the particular subshard is restored to the message cache by unevicting the particular subshard. Messages may be dequeued throughout process 700 in accordance with one or more embodiments described herein.

At block 708, an estimated enqueue rate is determined for one or more shards. For example, an estimated enqueue rate may be determined for each shard of the queue. In some embodiments, the estimated enqueue rate for a particular shard is based on one or more enqueue statistics collected with respect to the particular shard during one or more periods.

At block 710, an estimated dequeue rate is determined for one or more dequeuer-shard pairs. That is, for a particular dequeuer and a particular shard of a particular dequeuer-shard pair, an estimated dequeue rate is determined for the particular shard by the particular dequeuer. In some embodiments, the estimated dequeue rate for the particular dequeuer-shard pair is based on one or more dequeue statistics collected with respect to the particular shard and the particular dequeuer during one or more periods.

At block 712, estimated restore overhead data is determined based on the estimated enqueue rate for each shard and the estimated dequeue rate for each dequeuer-shard pair. In some embodiments, the estimated restore overhead is determined using a message cache model that classifies enqueuer-shard pairs into different classifications, such as on-time dequeuers and lagging dequeuers. The message cache model may handle classifications differently when determining estimated restore overhead data. In some embodiments, determining the estimated restore overhead data includes determining an estimated uneviction rate of restoring subshards upon access for one or more message cache sizes over a range of candidate message cache sizes. For example, the estimated uneviction rate for a plurality of message cache sizes may be determined using a message cache model.

At block 714, a preferred message cache size is determined based on the estimated restore overhead data. For example, the estimated message cache data may be automatically analyzed to determine a preferred message cache size. A size of the message cache may be automatically set to the preferred message cache size. Alternatively and/or in addition, the size of the message cache may be automatically set based on a plurality of recent preferred message cache sizes. Alternatively and/or in addition, one or more preferred message cache sizes may be presented to a user, and the size of the message cache may be changed based on user input.

At block 716, process 700 returns and/or terminates. For example, processing may continue by passing control to a calling process, generating any appropriate record or notification, returning after a method or function invocation, or terminating. In some embodiments, one or more blocks of process 700 is performed periodically, in response to one or more rate changes, and/or in response to a rate change that exceeds a particular threshold.

Figure 8:
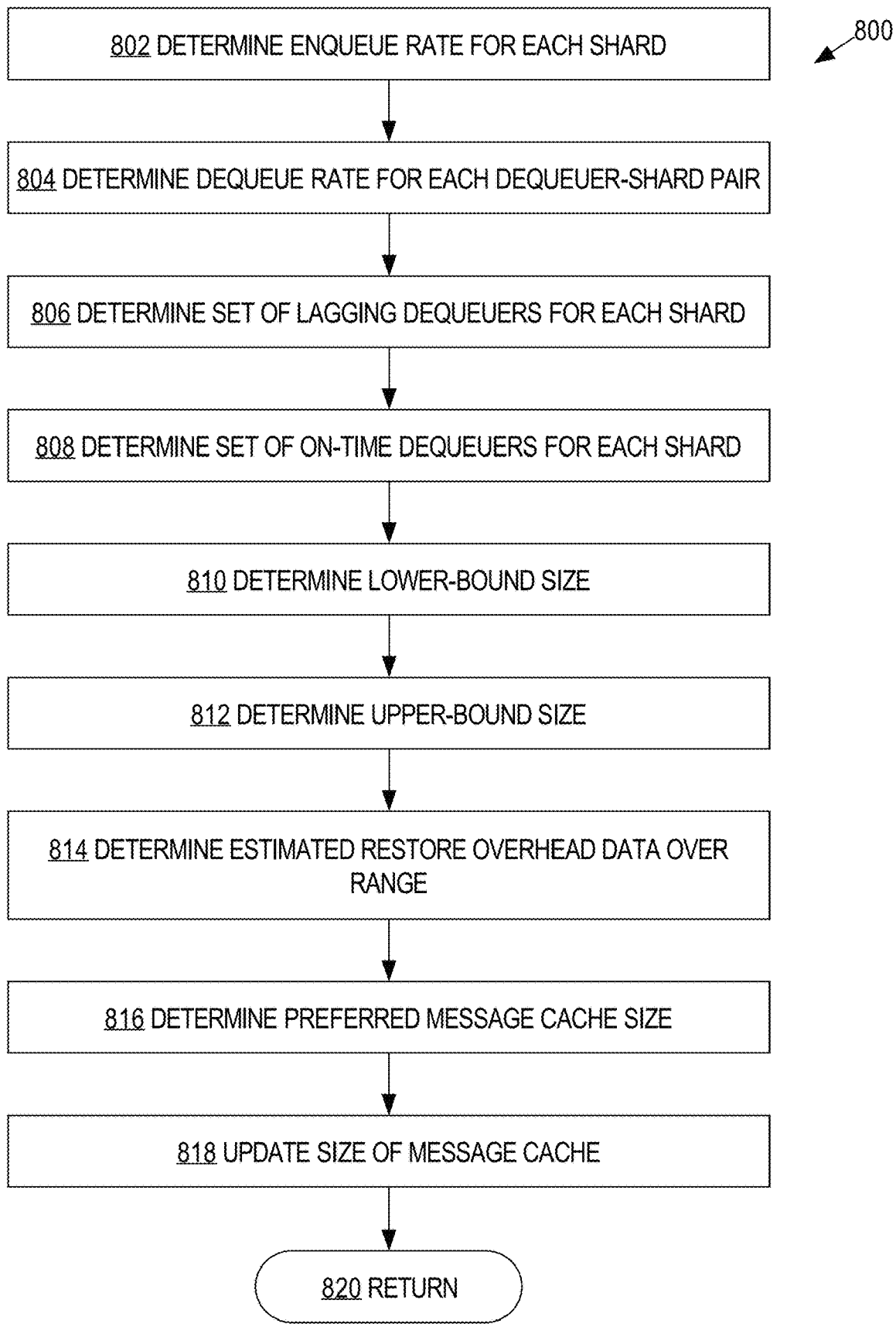
FIG. 8 is a flow diagram that illustrates an example process for determining a message cache size in accordance with one or more embodiments.

FIG. 8 is a flow diagram that illustrates an example process for determining a message cache size in accordance with one or more embodiments. Process 800 may be performed by one or more computing devices and/or processes thereof. For example, one or more blocks of process 800 may be performed by computing device 900. In some embodiments, one or more blocks of process 800 are performed by a database system, such as database system 400.

At block 802, an estimated enqueue rate is determined for each shard of a set of one or more shards. At block 804, an estimated dequeue rate is determined for each dequeuer-shard pair of one or more dequeuer-shard pairs. At block 806, a set of lagging dequeuers is determined for each shard of the set of one or more shards. At block 808, a set of on-time dequeuers is determined for each shard of the set of one or more shards.

At block 810, a lower-bound size for the message cache is determined. At block 812, an upper-bound size for the message cache is determined. At block 814, estimated restore overhead data is determined over a range of candidate message cache sizes from the lower-bound size to the upper-bound size. At block 816, a preferred message cache size is determined based on the estimated restore overhead data. At block 818, the size of the message cache is updated. In some embodiments, the size of the message cache is automatically set to the preferred size or another automatically computed size that is determined based on the preferred size.

At block 820, process 800 returns and/or terminates. For example, processing may continue by passing control to a calling process, generating any appropriate record or notification, returning after a method or function invocation, or terminating. In some embodiments, one or more blocks of process 800 is performed periodically, in response to one or more rate changes, and/or in response to a rate change that exceeds a particular threshold.

Database Systems

Since some embodiments described herein are implemented within the context of a database management system (DBMS), a description of a database management system is included herein. A DBMS manages a database. A DBMS may comprise one or more database servers. A database comprises database data and a database dictionary that are stored on a persistent memory mechanism, such as a set of hard disks. Database data may be stored in one or more data containers, each containing one or more records. The data within each record is organized into one or more fields. In relational DBMSs, the data containers are referred to as tables, the records are referred to as rows, and the fields are referred to as columns. In object-oriented databases, the data containers are referred to as object classes, the records are referred to as objects, also referred to herein as object records, and the fields are referred to as attributes. Other database architectures may use other terminology.

Users interact with a database server of a DBMS by submitting to the database server commands that cause the database server to perform operations on data stored in a database. A user may be one or more applications running on a client that interact with a database server.

A database command may be in the form of a database statement that conforms to a syntax of a database language. One example language for expressing database commands is the Structured Query Language (SQL). SQL data definition language ("DDL") instructions are issued to a DBMS to define database structures such as tables, views, or complex data types. For instance, CREATE, ALTER, DROP, and RENAME, are common examples of DDL instructions found in some SQL implementations. SQL data manipulation language ("DML") instructions are issued to a DBMS to manage data stored within a database structure. For instance, SELECT, INSERT, UPDATE, and DELETE are common examples of DML instructions found in some SQL implementations. SQL/XML is a common extension of SQL used when manipulating XML data in an object-relational database.

Performing operations within a database server often entails invoking multiple layers of software. A layer is set of software modules that perform a functionality that has been dedicated, to an extent, within a database server to the set of software modules. Executing an operation typically involves calling multiple layers of software, with one layer making a call to another layer, which during the execution of the first call, calls another layer. For example, to execute an SQL statement, an SQL layer is invoked. Typically, a client accesses a database server through an interface, such as an SQL interface to the SQL layer. The SQL layer analyzes and parses and executes the statement. During execution of the statement, the SQL layer calls modules of a lower layer to retrieve a particular row from a table and to update a particular row in a table. A client, such as a replication client, typically accesses the database via a database command to the database server, such as in the form of a SQL statement.

Although the examples described above are based on Oracle's SQL, the techniques provided herein are not limited to Oracle's SQL, to any proprietary form of SQL, to any standardized version or form of SQL (ANSI standard), or to any particular form of database command or database language. Furthermore, for the purpose of simplifying the explanations contained herein, database commands or other forms of computer instructions may be described as performing an action, such as creating tables, modifying data, and setting session parameters. However, it should be understood that the database command itself performs no actions, but rather the DBMS, upon executing the database command, performs the corresponding actions. Typically, database commands are executed over a synchronous connection to the database.

Software Overview

Figure 9:
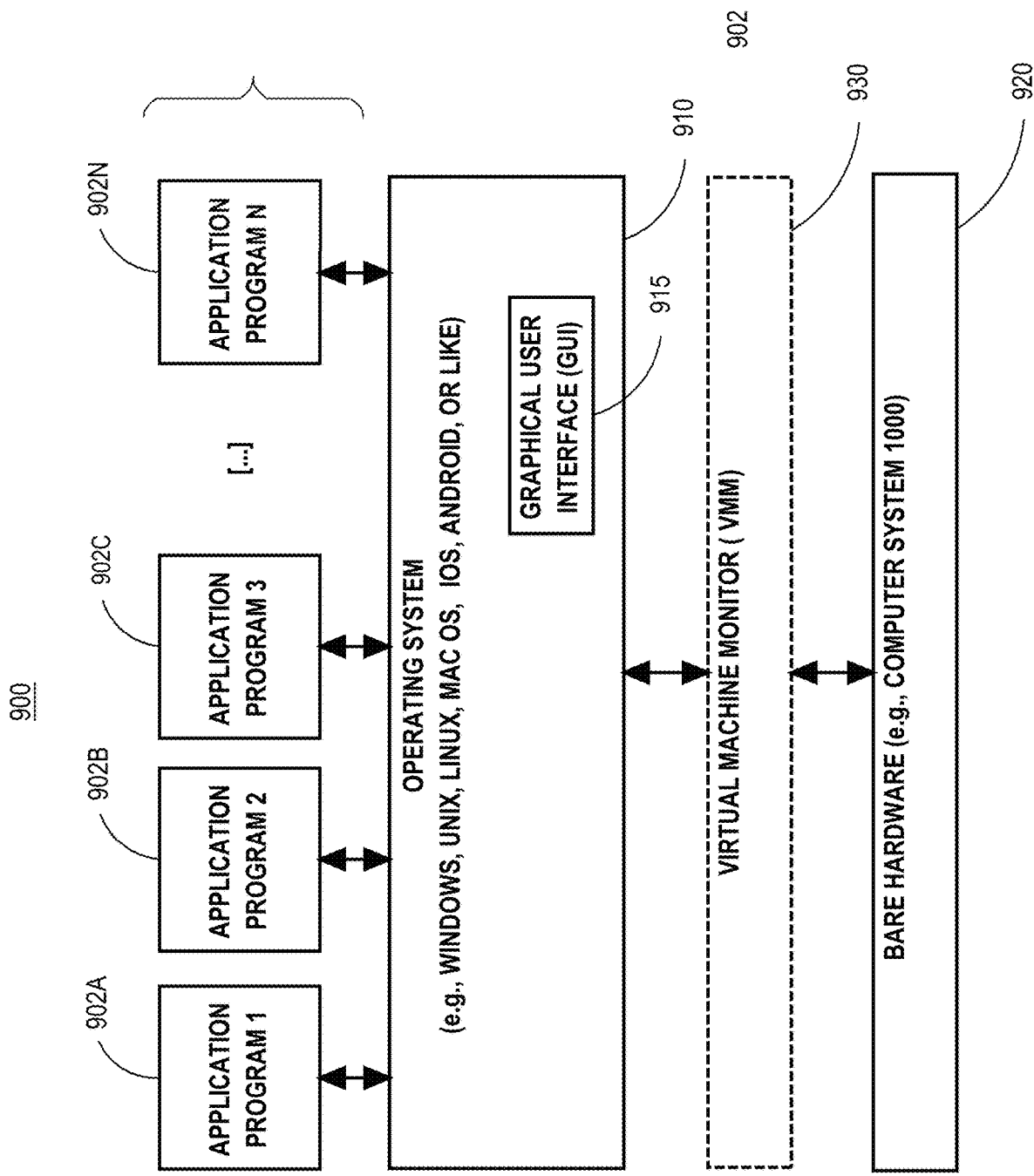
FIG. 9 is a block diagram that illustrates an example software system that may be employed for controlling the operation of a computing system.
Figure 10:
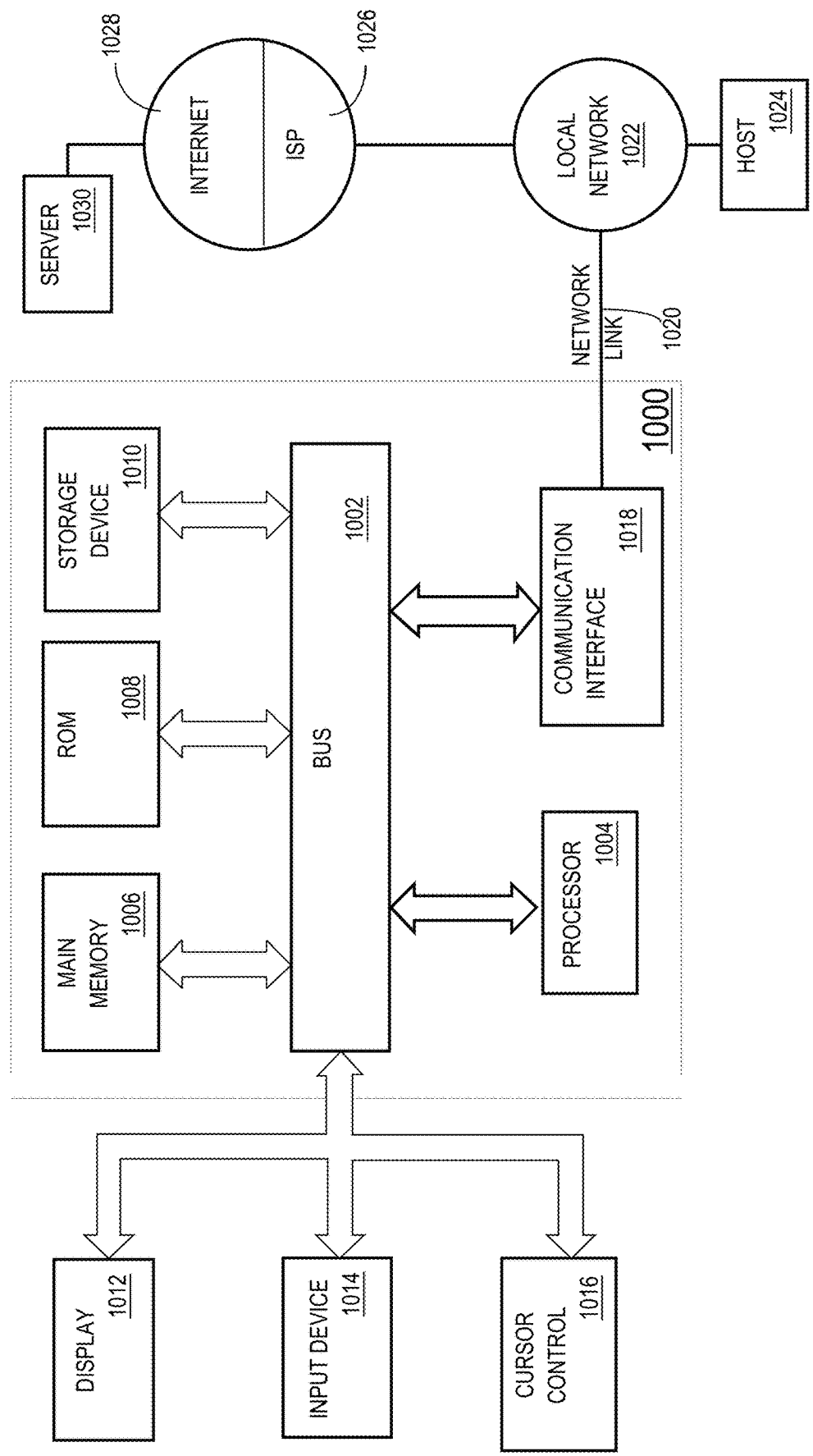
FIG. 10 illustrates a computer system upon which one or more embodiments may be implemented.

FIG. 9 is a block diagram of a basic software system 900 that may be employed for controlling the operation of computing system 1000 of FIG. 10. Software system 900 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 900 is provided for directing the operation of computing system 1000. Software system 900, which may be stored in system memory (RAM) 1006 and on fixed storage (e.g., hard disk or flash memory) 1010, includes a kernel or operating system (OS) 910.

The OS 910 manages low-level aspects of computer operation, including managing execution of processes, memory allocation, file input and output (I/O), and device I/O. One or more application programs, represented as 902A, 902B, 902C . . . 902N, may be "loaded" (e.g., transferred from fixed storage 1010 into memory 1006) for execution by the system 900. The applications or other software intended for use on computer system 1000 may also be stored as a set of downloadable computer-executable instructions, for example, for downloading and installation from an Internet location (e.g., a Web server, an app store, or other online service).

Software system 900 includes a graphical user interface (GUI) 915, for receiving user commands and data in a graphical (e.g., "point-and-click" or "touch gesture") fashion. These inputs, in turn, may be acted upon by the system 900 in accordance with instructions from operating system 910 and/or application(s) 902. The GUI 915 also serves to display the results of operation from the OS 910 and application(s) 902, whereupon the user may supply additional inputs or terminate the session (e.g., log off).

OS 910 can execute directly on the bare hardware 920 (e.g., processor(s) 1004) of computer system 1000. Alternatively, a hypervisor or virtual machine monitor (VMM) 930 may be interposed between the bare hardware 920 and the OS 910. In this configuration, VMM 930 acts as a software "cushion" or virtualization layer between the OS 910 and the bare hardware 920 of the computer system 1000.

VMM 930 instantiates and runs one or more virtual machine instances ("guest machines"). Each guest machine comprises a "guest" operating system, such as OS 910, and one or more applications, such as application(s) 902, designed to execute on the guest operating system. The VMM 930 presents the guest operating systems with a virtual operating platform and manages the execution of the guest operating systems.

In some instances, the VMM 930 may allow a guest operating system to run as if it is running on the bare hardware 920 of computer system 1000 directly. In these instances, the same version of the guest operating system configured to execute on the bare hardware 920 directly may also execute on VMM 930 without modification or reconfiguration. In other words, VMM 930 may provide full hardware and CPU virtualization to a guest operating system in some instances.

In other instances, a guest operating system may be specially designed or configured to execute on VMM 930 for efficiency. In these instances, the guest operating system is "aware" that it executes on a virtual machine monitor. In other words, VMM 930 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Multiple threads may run within a process. Each thread also comprises an allotment of hardware processing time but share access to the memory allotted to the process. The memory is used to store content of processors between the allotments when the thread is not running. The term thread may also be used to refer to a computer system process in multiple threads are not running.

Example Implementation System

According to some embodiments, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 10 is a block diagram that depicts a computer system 1000 upon which an embodiment may be implemented. Computer system 1000 includes a bus 1002 or other communication mechanism for communicating information, and a hardware processor 1004 coupled with bus 1002 for processing information. Hardware processor 1004 may be, for example, a general purpose microprocessor.

Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Such instructions, when stored in non-transitory storage media accessible to processor 1004, render computer system 1000 into a special-purpose machine that is customized to perform the operations specified in the instructions.

Computer system 1000 further includes a read only memory (ROM) 1008 or other static storage device coupled to bus 1002 for storing static information and instructions for processor 1004. A storage device 1010, such as a magnetic disk, optical disk, or solid-state drive is provided and coupled to bus 1002 for storing information and instructions.

Computer system 1000 may be coupled via bus 1002 to a display 1012, such as a cathode ray tube (CRT), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane.

Computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor 1004 executing one or more sequences of one or more instructions contained in main memory 1006. Such instructions may be read into main memory 1006 from another storage medium, such as storage device 1010. Execution of the sequences of instructions contained in main memory 1006 causes processor 1004 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 1010. Volatile media includes dynamic memory, such as main memory 1006. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid-state drive of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the world wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018.

The received code may be executed by processor 1004 as it is received, and/or stored in storage device 1010, or other non-volatile storage for later execution.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    enqueuing a plurality of messages from one or more enqueuers in a queue comprising at least one shard, each shard of the at least one shard comprising one or more subshards;
    maintaining, in memory, a message cache configured to store a plurality of cached subshards;
    wherein enqueuing a message comprises enqueuing the message in a current subshard of a particular shard, wherein enqueuing the message in the current subshard includes storing the message in a cached subshard corresponding to the current subshard of the particular shard;
    dequeuing the plurality of messages from the queue by a plurality of dequeuers from the message cache;
    for each shard of the at least one shard, determining an estimated enqueue rate;
    for each dequeuer-shard pair of a plurality of dequeuer-shard pairs comprising a particular dequeuer and a particular shard, determining an estimated dequeue rate of the particular shard by the particular dequeuer; and
    for a plurality of candidate message cache sizes, determining estimated restore overhead data for restoring subshards upon access based on the estimated enqueue rate for each shard and the estimated dequeue rate for each dequeuer-shard pair;
    wherein the method is performed by one or more computing devices.

2. The method of claim 1,
wherein determining the estimated restore overhead data includes determining the estimated restore overhead data during runtime and concurrently with enqueuing the plurality of messages and dequeuing the plurality of messages.

3. The method of claim 1, wherein determining the estimated restore overhead data includes determining an estimated uneviction rate of restoring sub shards upon access for one or more cache sizes in a range of candidate message cache sizes.

4. The method of claim 3, further comprising:
determining a lower-bound size for the range of candidate message cache sizes;
wherein the lower-bound size of the message cache accommodates:
sub shards that the one or more enqueuers is actively enqueuing to, and
sub shards that the one or more dequeuers is actively dequeuing from.

5. The method of claim 3, further comprising:
for each shard of the at least one shard, determining a set of on-time dequeuers and a set of lagging dequeuers;
determining an upper-bound size for the range of candidate message cache sizes;
wherein the upper-bound size of the message cache accommodates:
sub shards that the one or more enqueuers is actively enqueuing to,
sub shards that the set of lagging dequeuers is actively dequeuing from, and
sub shards that the set of on-time dequeuers will dequeue from.

6. The method of claim 1, further comprising:
for each shard of the at least one shard, determining a set of on-time dequeuers and a set of lagging dequeuers;
wherein the set of on-time dequeuers for a particular shard includes dequeuers with an estimated dequeue rate from the particular shard that is greater than or equal to the estimated enqueue rate of the particular shard;
wherein the set of lagging dequeuers for the particular shard includes dequeuers with an estimated dequeue rate from the particular shard that is less than the estimated enqueue rate of the particular shard.

7. The method of claim 1, further comprising determining a preferred message cache size based on the estimated restore overhead data.

8. The method of claim 1, further comprising determining a preferred message cache size that meets a particular performance requirement.

9. The method of claim 1, further including updating the estimated dequeue rate for each dequeuer-shard pair of said plurality of dequeuer-shard pairs when the particular dequeuer of said dequeuer-shard pair finishes dequeuing the messages in a subshard of the shard or when the dequeuer begins processing a next subshard of the shard.

10. The method of claim 1,
wherein all messages from a first enqueuer are enqueued in sub shards of a first shard of the at least one shard;
wherein all messages from a second enqueuer are enqueued in sub shards of a second shard of the at least one shard.

11. One or more non-transitory computer-readable media storing instructions which, when executed by one or more hardware processors, cause:

enqueuing a plurality of messages from one or more enqueuers in a queue comprising at least one shard, each shard of the at least one shard comprising one or more subshards;
maintaining, in memory, a message cache configured to store a plurality of cached subshards;
wherein enqueuing a message comprises enqueuing the message in a current subshard of a particular shard, wherein enqueuing the message in the current subshard includes storing the message in a cached subshard corresponding to the current subshard of the particular shard;
dequeuing the plurality of messages from the queue by a plurality of dequeuers from the message cache;
for each shard of the at least one shard, determining an estimated enqueue rate;
for each dequeuer-shard pair of a plurality of dequeuer-shard pairs comprising a particular dequeuer and a particular shard, determining an estimated dequeue rate of the particular shard by the particular dequeuer; and
for a plurality of candidate message cache sizes, determining estimated restore overhead data for restoring subshards upon access based on the estimated enqueue rate for each shard and the estimated dequeue rate for each dequeuer-shard pair.

12. The one or more non-transitory computer-readable media of claim 11,
wherein determining the estimated restore overhead data includes determining the estimated restore overhead data during runtime and concurrently with enqueuing the plurality of messages and dequeuing the plurality of messages.

13. The one or more non-transitory computer-readable media of claim 11, wherein determining the estimated restore overhead data includes determining an uneviction rate of restoring sub shards upon access for one or more cache sizes in a range of candidate message cache sizes.

14. The one or more non-transitory computer-readable media of claim 13,
wherein the instructions, when executed by one or more hardware processors, cause determining a lower-bound size for the range of candidate message cache sizes;
wherein the lower-bound size of the message cache accommodates:
sub shards that the one or more enqueuers is actively enqueuing to, and
sub shards that the one or more dequeuers is actively dequeuing from.

15. The one or more non-transitory computer-readable media of claim 13, wherein the instructions, when executed by one or more hardware processors, cause:
for each shard of the at least one shard, determining a set of on-time dequeuers and a set of lagging dequeuers;
determining an upper-bound size for the range of candidate message cache sizes;
wherein the upper-bound size of the message cache accommodates:
sub shards that the one or more enqueuers is actively enqueuing to,
sub shards that the set of lagging dequeuers is actively dequeuing from, and
sub shards that the set of on-time dequeuers will dequeue from.

16. The one or more non-transitory computer-readable media of claim 11, wherein the instructions, when executed by one or more hardware processors, cause:

for each shard of the at least one shard, determining a set of on-time dequeuers and a set of lagging dequeuers;

wherein the set of on-time dequeuers for a particular shard includes dequeuers with an estimated dequeue rate from the particular shard that is greater than or equal to the estimated enqueue rate of the particular shard;

wherein the set of lagging dequeuers for the particular shard includes dequeuers with an estimated dequeue rate from the particular shard that is less than the estimated enqueue rate of the particular shard.

17. The one or more non-transitory computer-readable media of claim 11, wherein the instructions, when executed by one or more hardware processors, cause determining a preferred message cache size based on the estimated restore overhead data.

18. The one or more non-transitory computer-readable media of claim 11, wherein the instructions, when executed by one or more hardware processors, cause determining a preferred message cache size that meets a particular performance requirement.

19. The one or more non-transitory computer-readable media of claim 11, wherein the instructions, when executed by one or more hardware processors, cause updating the estimated dequeue rate for each dequeuer-shard pair of said plurality of dequeuer-shard pairs when the particular dequeuer of said each dequeuer-shard pair finishes dequeuing the messages in a subshard of the shard or when the dequeuer begins processing a next subshard of the shard.

20. The one or more non-transitory computer-readable media of claim 11, wherein the instructions, when executed by one or more hardware processors, cause:
all messages from a first enqueuer to be enqueued in sub shards of a first shard of the at least one shard;
all messages from a second enqueuer to be enqueued in sub shards of a second shard of the at least one shard.

* * * * *

UNITED STATES PATENT AND TRADEMARK OFFICE
CERTIFICATE OF CORRECTION

PATENT NO. : 10,540,217 B2
APPLICATION NO. : 15/685270
DATED : January 21, 2020
INVENTOR(S) : Jaiswal et al.

It is certified that error appears in the above-identified patent and that said Letters Patent is hereby corrected as shown below:

On the Title Page

On page 3, Column 1, item (56) under Other Publications, Line 8, delete "Virtrual-" and insert -- Virtual- --, therefor.

On page 3, Column 1, item (56) under Other Publications, Lines 11-12, delete "Prefectching" and insert -- Prefetching --, therefor.

In the Specification

In Column 3, Line 9, delete "system." and insert -- system; --, therefor.

In Column 12, Line 11, delete "shown," and insert -- shown. --, therefor.

In the Claims

In Column 29, Line 9, in Claim 3, delete "sub shards" and insert -- subshards --, therefor.

In Column 29, Line 18, in Claim 4, delete "sub shards" and insert -- subshards --, therefor.

In Column 29, Line 20, in Claim 4, delete "sub shards" and insert -- subshards --, therefor.

In Column 29, Line 29, in Claim 5, delete "sub shards" and insert -- subshards --, therefor.

In Column 29, Line 31, in Claim 5, delete "sub shards" and insert -- subshards --, therefor.

In Column 29, Line 33, in Claim 5, delete "sub shards" and insert -- subshards --, therefor.

In Column 29, Line 56, in Claim 9, after "said" insert -- each --.

Signed and Sealed this
Sixth Day of April, 2021

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 10,540,217 B2

In Column 29, Line 61, in Claim 10, delete "sub shards" and insert -- subshards --, therefor.

In Column 29, Line 63, in Claim 10, delete "sub shards" and insert -- subshards --, therefor.

In Column 30, Line 37, in Claim 13, delete "sub shards" and insert -- subshards --, therefor.

In Column 30, Line 46, in Claim 14, delete "sub shards" and insert -- subshards --, therefor.

In Column 30, Line 48, in Claim 14, delete "sub shards" and insert -- subshards --, therefor.

In Column 30, Line 59, in Claim 15, delete "sub shards" and insert -- subshards --, therefor.

In Column 30, Line 61, in Claim 15, delete "sub shards" and insert -- subshards --, therefor.

In Column 30, Line 63, in Claim 15, delete "sub shards" and insert -- subshards --, therefor.

In Column 32, Lines 14-15, in Claim 20, delete "sub shards" and insert -- subshards --, therefor.

In Column 32, Line 17, in Claim 20, delete "sub shards" and insert -- subshards --, therefor.